(12) United States Patent
Denoual et al.

(10) Patent No.: US 10,575,004 B2
(45) Date of Patent: Feb. 25, 2020

(54) METHOD, DEVICE, AND COMPUTER PROGRAM FOR OBTAINING MEDIA DATA AND METADATA FROM ENCAPSULATED BIT-STREAMS WHEREIN OPERATING POINT DESCRIPTORS CAN BE DYNAMICALLY SET

(71) Applicant: CANON KABUSHIKI KAISHA, Tokyo (JP)

(72) Inventors: Franck Denoual, Saint Domineuc (FR); Frédéric Maze, Langan (FR); Naël Ouedraogo, Maure de Bretagne (FR); Cyril Concolato, Combs la Ville (FR); Jean Le Feuvre, Cachan (FR)

(73) Assignee: Canon Kabushiki Kaisha, Tokyo (JP)

( * ) Notice: Subject to any disclaimer, the term of this patent is extended or adjusted under 35 U.S.C. 154(b) by 151 days.

(21) Appl. No.: 15/736,265

(22) PCT Filed: Jun. 7, 2016

(86) PCT No.: PCT/EP2016/062926
§ 371 (c)(1),
(2) Date: Dec. 13, 2017

(87) PCT Pub. No.: WO2016/202648
PCT Pub. Date: Dec. 22, 2016

(65) Prior Publication Data
US 2018/0184098 A1      Jun. 28, 2018

(30) Foreign Application Priority Data
Jun. 16, 2015   (GB) .................................. 1510610.7

(51) Int. Cl.
*H04N 19/33*      (2014.01)
*H04L 29/06*      (2006.01)
(Continued)

(52) U.S. Cl.
CPC ........... *H04N 19/33* (2014.11); *H04L 65/607* (2013.01); *H04N 19/132* (2014.11);
(Continued)

(58) Field of Classification Search
None
See application file for complete search history.

(56) References Cited

U.S. PATENT DOCUMENTS

2011/0032999 A1* 2/2011  Chen ............. H04N 21/234327
                                                375/240.26
2013/0249900 A1  9/2013  Lee et al.

FOREIGN PATENT DOCUMENTS

CN    1666195 A    9/2005
GB    2519746 A    6/2015
(Continued)

OTHER PUBLICATIONS

Jean Le Feuvre, et al.,"Support for efficient tile access in the HEVC File Format", 104. MPEG Meeting, Apr. 22, 2013-Apr. 26, 2013, Incheon, Motion Picture Expert Group or ISO/IEC JTC1/SC29/WG11, No. M29231, Apr. 17, 2013, XP030057763, the whole document.

(Continued)

*Primary Examiner* — Sath V Perungavoor
*Assistant Examiner* — Tyler B Edwards
(74) *Attorney, Agent, or Firm* — Canon U.S.A., Inc. IP Division

(57) ABSTRACT

The invention relates to a method for obtaining media data and metadata from an encapsulated bit-stream resulting from the encapsulation of one or more bit-streams, the media data of each of the one or more bit-streams being organized into one or more layers, each layer comprising timed samples or sub-samples. A data structure is obtained for referencing metadata including at least one definition of at least one (Continued)

group of timed samples of the media data. At least one operating point descriptor is obtained for each of the one or more bit-streams, the at least one operating point descriptor providing metadata related to descriptive information enabling timed samples belonging to a group of timed samples defined in metadata referenced by the data structure to be independently decoded. Each operating point descriptor associated with one group of timed samples defines the descriptive information of the timed samples belonging to the group.

19 Claims, 12 Drawing Sheets

(51) Int. Cl.
| | |
|---|---|
| *H04N 19/162* | (2014.01) |
| *H04N 19/132* | (2014.01) |
| *H04N 19/184* | (2014.01) |
| *H04N 19/167* | (2014.01) |
| *H04N 19/587* | (2014.01) |
| *H04N 19/70* | (2014.01) |
| *H04N 21/845* | (2011.01) |
| *H04N 21/234* | (2011.01) |
| *H04N 21/44* | (2011.01) |
| *H04N 19/30* | (2014.01) |
| *H04N 19/154* | (2014.01) |
| *H04N 19/597* | (2014.01) |

(52) U.S. Cl.
CPC ......... *H04N 19/162* (2014.11); *H04N 19/167* (2014.11); *H04N 19/184* (2014.11); *H04N 19/30* (2014.11); *H04N 19/587* (2014.11); *H04N 19/70* (2014.11); *H04N 21/23424* (2013.01); *H04N 21/44016* (2013.01); *H04N 21/845* (2013.01); *H04N 19/154* (2014.11); *H04N 19/597* (2014.11)

(56) References Cited

FOREIGN PATENT DOCUMENTS

| | | | |
|---|---|---|---|
| GB | 2527786 A * | 1/2016 | ..... H04N 21/234327 |
| KR | 20150036299 A | 4/2015 | |
| WO | 2015/011108 A1 | 1/2015 | |
| WO | 2015/011109 A1 | 1/2015 | |

OTHER PUBLICATIONS

Cyril Concolato, et al., "Clarification on Layered HEVC storage in ISOBMFF", 111. MPEG Meeting; Feb. 6, 2015-Feb. 20, 2015, Geneva, Motion Picture Expert Group or ISO/IEC JTC1/SC29/WG11, No. M35848, Feb. 11, 2015, XP030064216, the whole document.

* cited by examiner

| HEVC Layer 2 sub-partition 0 | HEVC Layer 2 sub-partition 1 |
| --- | --- |
| HEVC Layer 1 sub-partition 0 | HEVC Layer 1 sub-partition 1 |
| HEVC Layer 0 sub-partition 0 | HEVC Layer 0 sub-partition 1 |

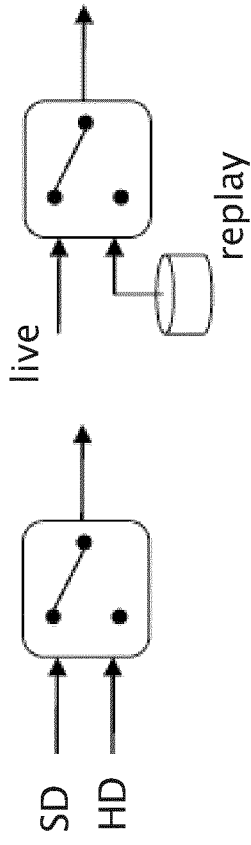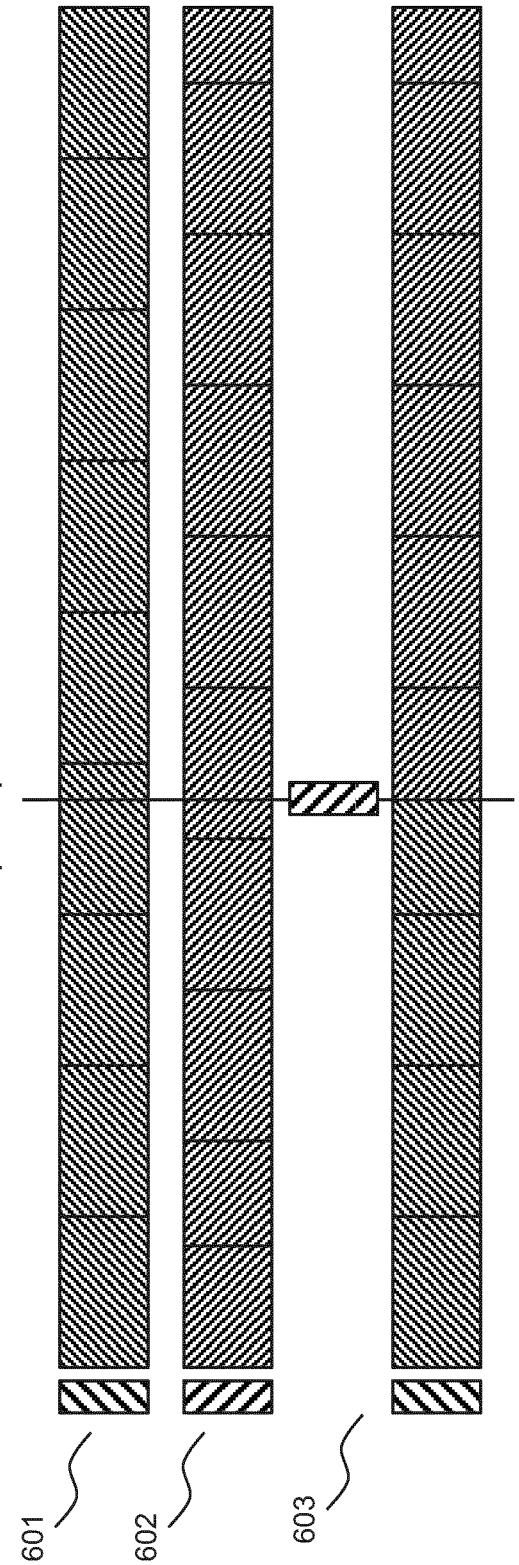

```
aligned(8) class LHEVCDecoderConfigurationRecord {
            unsigned int(8) configurationVersion = 1;
            bit(1) complete_representation;  ~1102
            bit(3) reserved = '111'b;
            unsigned int(12) min_spatial_segmentation_idc;
            bit(6) reserved = '111111'b;
            unsigned int(2) parallelismType;
            bit(2) reserved = '11'b;
            bit(3) numTemporalLayers;
            bit(1) temporalIdNested;
            bit(2) reserved;                 1101
            unsigned int (6) layer_id;
            unsigned int(2) lengthSizeMinusOne;
            unsigned int(8) numOfArrays;
            for (j=0; j < numOfArrays; j++) {
                        bit(1) array_completeness;
                        unsigned int(1) reserved = 0;
                        unsigned int(6) NAL_unit_type;
                        unsigned int(16) numNalus;
                        for (i=0; i< numNalus; i++) {
                                    unsigned int(16) nalUnitLength;
                                    bit(8*nalUnitLength) nalUnit;
                        }
            }
}
```

Fig. 11

METHOD, DEVICE, AND COMPUTER PROGRAM FOR OBTAINING MEDIA DATA AND METADATA FROM ENCAPSULATED BIT-STREAMS WHEREIN OPERATING POINT DESCRIPTORS CAN BE DYNAMICALLY SET

FIELD OF THE INVENTION

The invention generally relates to the field of encapsulation of timed media data, e.g. according to Base Media File Format as defined by the MPEG standardization organization, to provide a flexible and extensible format that facilitates interchange, management, editing, and presentation of the media data and to improve stream delivery, in particular regarding HTTP (HyperText Transfer Protocol) and RTP (Real-time Transport Protocol) streaming of user-selected regions of interest in compressed video streams. More particularly, the invention concerns a method, device, and computer program for obtaining media data and metadata from encapsulated bit-streams wherein operating point descriptors can be dynamically set.

BACKGROUND OF THE INVENTION

Video coding is a way of transforming a series of video images into a compact digitized bit-stream so that the video images can be transmitted or stored. An encoding device is used to code the video images, with an associated decoding device being available to reconstruct the bit-stream for display and viewing. A general aim is to form the bit-stream so as to be of smaller size than the original video information. This advantageously reduces the capacity required of a transfer network, or storage device, to transmit or store the bit-stream code. To be transmitted, a video bit-stream is generally encapsulated according to a transmission protocol that typically adds headers and check bits. Video streaming mechanisms are widely deployed and used over the Internet network and mobile networks to stream audio/video media over HTTP (HyperText Transfer Protocol) such as 3GPP's Adaptive HTTP Streaming (AHS), Microsoft's Smooth Streaming or Apple's HTTP live streaming for instance.

Recently, the Moving Picture Experts Group (MPEG) published a new standard to unify and supersede existing streaming solutions over HTTP. This new standard, called "Dynamic adaptive streaming over HTTP (DASH)", is intended to support a media-streaming model over HTTP based on standard web servers, in which intelligence (i.e. selection of media data to stream and dynamic adaptation of the bit-streams to user choices, network conditions, and client capabilities) relies exclusively on client choices and devices.

In this model, a media presentation is organized in data segments and in a manifest called "Media Presentation Description (MPD)" which represents the organization of timed media data to be presented. In particular, a manifest comprises resource identifiers to use for downloading data segments and provides the context to select and combine those data segments to obtain a valid media presentation. Resource identifiers are typically HTTP-URLs (Uniform Resource Locator), possibly combined with byte ranges. Based on a manifest, a client device determines at any time which media segments are to be downloaded from a media data server according to its needs, its capabilities (e.g. supported codecs, display size, frame rate, level of quality, etc.), and depending on network conditions (e.g. available bandwidth).

It is to be noted that there exist alternative protocols to HTTP, for example the Real-time Transport Protocol (RTP).

In addition, video resolution is continuously increasing, going from standard definition (SD) to high definition (HD), and to ultra-high definition (e.g. 4K2K or 8K4K, that is to say video comprising images of 4,096×2,400 pixels or 7,680×4,320 pixels). However, not all receiving and video decoding devices have resources (e.g. network access bandwidth or CPU (Central Processing Unit)) to access video in full resolution, in particular when video is of ultra-high definition, and not all users need to access such video. In such a context, it is particularly advantageous to provide the ability of accessing and extracting only some parts of the video bit-stream that is to say, for example, to access only some scalability layer, views, or spatial sub-parts of a whole video sequence.

A known mechanism to access scalability layers, views, or spatial sub-parts of frames belonging to a video consists in organizing each frame of the video as an arrangement of layers, potentially with coding dependencies. Some video formats such HEVC (High Efficiency Video Coding) provide support for temporal, SNR (quality), and spatial scalability layers, for multiple views and/or for tile encoding. For example, a user-defined ROI may cover one or several contiguous tiles. In case of multi-view, a user may prefer stereo than single view. In case of scalability, the appropriate layer can be selected depending on user's device in terms of screen size or processing power for example.

To make it possible the selection, extraction, and transmission of only relevant parts of the video bit-stream (i.e. a sub-bit-stream), the organization of the video bit-stream (and more generally the organization of media data that may comprise video but also audio, metadata, subtitles, and the like) has to be exposed to media players. This organization is expressed as a list of operation points.

An operation point, also referred to as an operating point, represents a portion or a bit-stream subset of a Layered HEVC bit-stream which can be obtained by extracting a bit-stream portion consisting of all the data needed to decode this particular bit-stream subset and that can be decoded independently of other operation points. As a consequence, an operation point is a set of output layers associated with a range of temporal identifiers having values varying from zero to a selected maximum value, inclusive. For the sake of illustration, two temporal identifier values (0 and 1) corresponding to frame-rates of 30 Hz and 60 Hz are illustrated in FIGS. 5a and 5b.

FIG. 5, comprising FIGS. 5a and 5b, illustrates examples of a layer configuration where a non-output layer is involved.

More precisely, FIG. 5a illustrates an example of the relation between several representations of a video sequence. These representations comprise representations having different temporal resolutions (i.e. frame rate of 30 Hz and of 60 Hz) and for each of the temporal resolutions, the representations comprise different views (i.e. left, right, and common).

As represented, the common view is directly derivable from the left and right views and the common view with a frame rate of 30 Hz is directly derivable from the common view with a frame rate of 60 Hz.

The representations also comprise non scalable representations of the full views according to each of the temporal resolutions.

As illustrated in FIG. 5b, the representations illustrated in FIG. 5a can be encoded according to three layers corresponding to the three possible views (i.e. left, right, and common) and according to the two frame rates (i.e. 30 Hz and 60 Hz).

Accordingly, for streaming video sequences or user-selected data according to HTTP protocol, it is important to provide encapsulation of timed media data of an encoded video bit-stream in a way that enables access to the selected data and their coding dependencies to transmit the minimum amount of data enabling the reconstruction, decoding and display of the user-selected data.

A typical usage of adaptive HTTP streaming is the bit-stream splicing.

FIG. 6, comprising FIGS. 6a, 6b, and 6c, illustrates an example of a bit-stream splicing application.

As illustrated in FIG. 6a, bit-stream splicing may consist in switching from a low resolution bit-stream (SD) to a high resolution bit-stream (HD). According to another example illustrated in FIG. 6b, bit-stream splicing may consist in switching from a live bit-stream to an on-demand bit-stream for replay.

In such cases, the spliced bit-stream denoted 603 results from the combination of the two alternative bit-streams denoted 601 and 602 having their organization described in their respective initialization segments (i.e. 'moov' and 'trak' boxes when encapsulated in accordance with the International Standard Organization Base Media File Format).

In the case according to which the two streams 601 and 602 have different operation points, the spliced bit-stream 603 should contain the concatenation of the two different operation point lists. This may arise, for example, when storing spliced HEVC bit-streams with different VPS (video parameter set).

However, it is not possible to dynamically associate the concatenation of two different operation point lists with a spliced bit-stream according to the current encapsulation format of L-HEVC. A similar limitation exists with video bit-streams having their layer organization, their scalability type or their profile, tier or level (actually any parameter in the operation point description) varying along time: the descriptive metadata (for example the hierarchy of 'trak' file format boxes) cannot be dynamically updated.

Such problems may be encountered, for example, when streaming a long-running fragmented MP4 file with changes in layer configuration. In such a case, a content producer defines two scalable layers for two classes of devices (e.g. SD, HD). If, after a period of time, a new class of device (e.g. UHD) is available, it should be possible to reuse the two tracks and to add an extra layer. In a configuration where movie fragments are used, the operation of removing fragments should not lead to information loss. If the layer configuration changes during the streaming this should be captured.

Another example is directed to the concatenation of files obeying to the same profile constraints. Such a concatenation may follow different strategies:
- samples in tracks containing the base layers from both files could simply be concatenated, leading to multiple VPS/SPS/PPS in different sample entries or in larger hvcC NALU arrays;
- samples from non-base layers could be concatenated by inspecting tracks one by one and concatenating them with samples from tracks corresponding to layers with similar constraints, if any;
- samples from the non-base layer tracks of the second file could be added to new sets of tracks, shifted in time to maintain synchronization with the concatenated base track. The latter approach is complex and might not be preferable. In such scenario, it might be useful to allow for track-layer configuration changes These limitations result from the fact that the current descriptor for operation points is declared as one single instance for the whole mp4 file.

It is to be recalled that encoded video bit-streams are organized into NAL (Network Abstraction Layer) units which are generally constructed as a set of contiguous temporal samples that correspond to complete frames, the temporal samples being organized as a function of the decoding order. File formats are used to encapsulate and describe such encoded bit-streams.

For the sake of illustration, the International Standard Organization Base Media File Format (ISO BMFF) is a well-known flexible and extensible format that describes encoded timed media data bit-streams either for local storage or transmission via a network or via another bit-stream delivery mechanism. This file format is object-oriented. It is composed of building blocks called boxes that are sequentially or hierarchically organized and that define parameters of the encoded timed media data bit-stream such as timing and structure parameters. According to this file format, the timed media data bit-stream is contained in a data structure referred to as mdat box that is defined in another data structure referred to as track box. The track represents a timed sequence of samples where a sample corresponds to all the data associated with a single timestamp that is to say all the data associated with a single frame or all the data associated with several frames sharing the same timestamp.

For scalable video such as video of the multi-layer HEVC format, the layered media data organization can be efficiently represented by using multiple dependent tracks, each track representing the video at a particular level of scalability. In order to avoid data duplication between tracks, extractors can be used. According to a standard file format, an extractor is a specific kind of network abstraction layer (NAL) data structure directly included in a bit-stream that enables efficient extraction of other network abstraction layer (NAL) units from other bit-streams. For instance, the bit-stream of an enhancement layer track may comprise extractors that reference NAL units from a base layer track. Then later on, when such enhancement layer track is extracted from the file format, extractors must be replaced by the data that they are referencing.

Several strategies can be adopted when using ISO BMFF embedding these mechanisms to describe sub-information and to ease access to this sub-information or to efficiently organize bit-streams into multiple segments.

For example, in the article entitled "Implications of the ISO Base Media File Format on Adaptive HTTP Streaming of H.264/SVC", the authors, Kofler et al., present three different strategies for organizing a scalable video bit-stream (H264/SVC) for HTTP streaming considering possibilities as well as limitations of the ISO BMFF:
a) a single file containing a particular file header comprising a file type box "ftyp" and a movie box "moov" containing all ISO BMFF metadata (including track definitions), the single file also comprising a single mdat box containing the whole encoded bit-stream. This organization is suitable for local storage but is not adapted to HTTP streaming where a client may only need a part of the whole bit-stream. Such an organization is preferably used for a file used as an initialization file when the bit-stream is fragmented into multiple segments. This initialization file is followed by one other single file whose organization is defined in b), this initialization file gathering information about all the segments;

b) a single file containing multiple moof/mdat boxes suitable for fragmentation each couple of moof/mdat being relative to one of the multiple segments of the bit-streams. This format allows for progressive download. More in detail, the moof box is equivalent to the moov box at fragment level. According to this scheme, using a fragmented media file, the scalable bit-stream can be split into multiple dependent tracks representing the video at different scalability levels. Extractors are specific NAL units used to reference NAL units from other track(s). In case a track per tile is used, all addressable tracks have to be prepared in advance and tracks cannot be selected independently. If several tiles are to be displayed, several bit-streams must be decoded and the base layer is decoded several times. The last organization described in c) is particularly suitable for selected each track independently;

c) multiple segments files, each file being accessible by its own URL and being downloadable independently. Each file is related to one fragment and the multiple segment files are preferably preceded by a dedicated initialization file. Each segment typically consists of a segment type box (styp), which acts as a kind of file header, an optional segment index box (sidx) and one or multiple fragments. Again, each fragment consists of a moof and an mdat box. According to this scheme, using a fragmented media file, each track is stored in its own segment with the associated bit-stream related to one level of scalability. If necessary, extractors are used to reference required bit-stream from dependent tracks. Such a coding scheme is particularly suitable for streaming tracks independently. It is well adapted to the DASH standard but it is not suitable for tile streaming since several bit-streams are to be decoded and thus, one decoder per track is required. Moreover, there is a potential duplication of the base layer's bit-stream when selecting more than one tile.

The definition of the boxes above mentioned as well as the definition of sub-boxes included in those boxes made in reference to the document known as "Draft text of ISO/IEC DIS 14496-15 4th edition, ISO/IEC JTC1/SC29/WG11, W15182, April 2015, Geneva, Switzerland" (named "w15182" below) may lead to complex and less efficient organization of the ISO BMFF metadata.

Moreover the tile tracks are not properly defined for Layered HEVC, limiting it usage.

To solve these issues and, in particular, to make it possible to dynamically set descriptors for operation points, there is provided an efficient data organization and track description scheme suitable especially for handling spatial tiles, scalable layers and multiple views in Layered HEVC for multi-layer video streams. This ensures that the result of the ISO BMFF parsing is more efficient and adapted to Layered HEVC.

SUMMARY OF THE INVENTION

Faced with these constraints, the inventors provide a method and a device for encapsulating multi-layer tiled timed media data in a server and for providing a timed media data bit-stream from multi-layer tiled timed media data encapsulated in a plurality of media segment files.

It is a broad object of the invention to remedy the shortcomings of the prior art as described above.

According to a first aspect of the invention there is provided a method for obtaining media data and metadata from an encapsulated bit-stream resulting from the encapsulation of one or more bit-streams, the media data of each of the one or more bit-streams being organized into one or more layers, each layer comprising timed samples or sub-samples, the method comprising:

obtaining a data structure for referencing metadata including at least one definition of at least one group of timed samples of the media data, and obtaining at least one operating point descriptor for each of the one or more bit-streams, the at least one operating point descriptor providing metadata related to descriptive information enabling timed samples belonging to a group of timed samples defined in metadata referenced by the data structure to be independently decoded, wherein each operating point descriptor associated with one group of timed samples defines the descriptive information of the timed samples belonging to the group.

Therefore, the method of the invention makes it possible to dynamically set operating point descriptors and thus, to optimize the amount of data to be transmitted between a server and a client device, in particular when transmitting media data according to the Standard Organization Base Media File Format.

In an embodiment, the media data of at least one of the one or more bit-streams are organized into several layers, each of the layers being associated with a temporal scalability level and/or with a spatial scalability level and/or with a SNR scalability level and/or with a view in a multi-view representation.

In an embodiment, the encapsulated bit-stream comprises at least one track, the data structure and the at least one operating point descriptor being received in the at least one track.

In an embodiment, the encapsulated bit-stream comprises a plurality of tracks, each track of the plurality of tracks other than the at least one track referencing the at least one track.

In an embodiment, each layer of each of the one or more bit-streams is associated with a specific track of the plurality of tracks.

In an embodiment, the at least one track is a dedicated track for transmitting the data structure and the at least one operating point descriptor.

In an embodiment, the at least one track comprises timed samples or sub-samples.

In an embodiment, the method further comprises obtaining at least one layer descriptor, said at least one layer descriptor providing metadata related to layer organization in at least one of the one or more bit-streams.

In an embodiment, one layer descriptor is defined as a default layer descriptor so that timed samples belonging to a group of timed samples that is not associated with metadata related to layer organization are decoded based on the metadata provided by the default layer descriptor.

In an embodiment, one operating point descriptor is defined as a default operating point descriptor so that timed samples belonging to a group of timed samples that is not associated with metadata related to descriptive information are decoded based on the metadata provided by the default operating point descriptor.

In an embodiment, the data structure for referencing metadata is of the SampleToGroupBox type according to the International Standard Organization Base Media File Format.

In an embodiment, metadata referenced by the data structure and including definition of at least one group of timed samples are defined in a structure of the SampleGroupDescriptionBox type according to the International Standard Organization Base Media File Format.

According to a second aspect of the invention there is provided a method for providing media data and metadata to a bit-stream to be encapsulated for encapsulation of one or more bit-streams, the media data of each of the one or more bit-streams being organized into one or more layers, each layer comprising timed samples or sub-samples, the method comprising:

providing a data structure for referencing metadata including at least one definition of at least one group of timed samples of the media data, and providing at least one operating point descriptor for each of the one or more bit-streams, the at least one operating point descriptor providing metadata related to descriptive information enabling timed samples belonging to a group of timed samples defined in metadata referenced by the data structure to be independently decoded, wherein each operating point descriptor associated with one group of timed samples defines the descriptive information of the timed samples belonging to the group.

Therefore, the method of the invention makes it possible to dynamically set operating point descriptors and thus, to optimize the amount of data to be transmitted between a server and a client device, in particular when transmitting media data according to the Standard Organization Base Media File Format.

In an embodiment, the media data of at least one of the one or more bit-streams are organized into several layers, each of the layers being associated with a temporal scalability level and/or with a spatial scalability level and/or with a SNR scalability level and/or with a view in a multi-view representation.

In an embodiment, the bit-stream to be encapsulated comprises at least one track, the data structure and the at least one operating point descriptor being transmitted in the at least one track.

In an embodiment, the encapsulated bit-stream comprises a plurality of tracks, each track of the plurality of tracks other than the at least one track referencing the at least one track.

In an embodiment, each layer of each of the one or more bit-streams is associated with a specific track of the plurality of tracks.

In an embodiment, the at least one track is a dedicated track for transmitting the data structure and the at least one operating point descriptor.

In an embodiment, the at least one track comprises timed samples or sub-samples.

In an embodiment, the method further comprises providing at least one layer descriptor, said at least one layer descriptor providing metadata related to layer organization in at least one of the one or more bit-streams.

In an embodiment, one layer descriptor is defined as a default layer descriptor so that timed samples belonging to a group of timed samples that is not associated with metadata related to layer organization are decoded based on the metadata provided by the default layer descriptor.

In an embodiment, one operating point descriptor is defined as a default operating point descriptor so that timed samples belonging to a group of timed samples that is not associated with metadata related to descriptive information are decoded based on the metadata provided by the default operating point descriptor.

In an embodiment, the data structure for referencing metadata is of the SampleToGroupBox type according to the International Standard Organization Base Media File Format.

In an embodiment, metadata referenced by the data structure and including definition of at least one group of timed samples are defined in a structure of the SampleGroupDescriptionBox type according to the International Standard Organization Base Media File Format.

According to a third aspect of the invention there is provided a device for obtaining media data and metadata from an encapsulated bit-stream resulting from the encapsulation of one or more bit-streams, the media data of each of the one or more bit-streams being organized into one or more layers, each layer comprising timed samples or sub-samples, the device comprising a processor configured for carrying out the steps of:

obtaining a data structure for referencing metadata including at least one definition of at least one group of timed samples of the media data, and obtaining at least one operating point descriptor for each of the one or more bit-streams, the at least one operating point descriptor providing metadata related to descriptive information enabling timed samples belonging to a group of timed samples defined in metadata referenced by the data structure to be independently decoded, wherein each operating point descriptor associated with one group of timed samples defines the descriptive information of the timed samples belonging to the group.

Therefore, the device of the invention makes it possible to dynamically set operating point descriptors and thus, to optimize the amount of data to be transmitted between a server and a client device, in particular when transmitting media data according to the Standard Organization Base Media File Format.

In an embodiment, the media data of at least one of the one or more bit-streams are organized into several layers, each of the layers being associated with a temporal scalability level and/or with a spatial scalability level and/or with a SNR scalability level and/or with a view in a multi-view representation.

In an embodiment, the encapsulated bit-stream comprises at least one track, the data structure and the at least one operating point descriptor being received in the at least one track.

In an embodiment, the encapsulated bit-stream comprises a plurality of tracks, each track of the plurality of tracks other than the at least one track referencing the at least one track.

In an embodiment, each layer of each of the one or more bit-streams is associated with a specific track of the plurality of tracks.

In an embodiment, the at least one track is a dedicated track for transmitting the data structure and the at least one operating point descriptor.

In an embodiment, the at least one track comprises timed samples or sub-samples.

In an embodiment, the processor is further configured for carrying out the step of obtaining at least one layer descriptor, said at least one layer descriptor providing metadata related to layer organization in at least one of the one or more bit-streams.

In an embodiment, one layer descriptor is defined as a default layer descriptor so that timed samples belonging to a group of timed samples that is not associated with metadata related to layer organization are decoded based on the metadata provided by the default layer descriptor.

In an embodiment, one operating point descriptor is defined as a default operating point descriptor so that timed samples belonging to a group of timed samples that is not associated with metadata related to descriptive information are decoded based on the metadata provided by the default operating point descriptor.

In an embodiment, the data structure for referencing metadata is of the SampleToGroupBox type according to the International Standard Organization Base Media File Format.

In an embodiment, metadata referenced by the data structure and including definition of at least one group of timed samples are defined in a structure of the SampleGroupDescriptionBox type according to the International Standard Organization Base Media File Format.

According to a fourth aspect of the invention there is provided a device for providing media data and metadata to a bit-stream to be encapsulated for encapsulation of one or more bit-streams, the media data of each of the one or more bit-streams being organized into one or more layers, each layer comprising timed samples or sub-samples, the device comprising a processor configured for carrying out the steps of:

providing a data structure for referencing metadata including at least one definition of at least one group of timed samples of the media data, providing at least one operating point descriptor for each of the one or more bit-streams, the at least one operating point descriptor providing metadata related to descriptive information enabling timed samples belonging to a group of timed samples defined in metadata referenced by the data structure to be independently decoded, wherein each operating point descriptor associated with one group of timed samples defines the descriptive information of the timed samples belonging to the group.

Therefore, the device of the invention makes it possible to dynamically set operating point descriptors and thus, to optimize the amount of data to be transmitted between a server and a client device, in particular when transmitting media data according to the Standard Organization Base Media File Format.

In an embodiment, the media data of at least one of the one or more bit-streams are organized into several layers, each of the layers being associated with a temporal scalability level and/or with a spatial scalability level and/or with a SNR scalability level and/or with a view in a multi-view representation.

In an embodiment, the bit-stream to be encapsulated comprises at least one track, the data structure and the at least one operating point descriptor being transmitted in the at least one track.

In an embodiment, the encapsulated bit-stream comprises a plurality of tracks, each track of the plurality of tracks other than the at least one track referencing the at least one track.

In an embodiment, each layer of each of the one or more bit-streams is associated with a specific track of the plurality of tracks.

In an embodiment, the at least one track is a dedicated track for transmitting the data structure and the at least one operating point descriptor.

In an embodiment, the at least one track comprises timed samples or sub-samples.

In an embodiment, the processor is further configured for carrying out the step of providing at least one layer descriptor, said at least one layer descriptor providing metadata related to layer organization in at least one of the one or more bit-streams.

In an embodiment, one layer descriptor is defined as a default layer descriptor so that timed samples belonging to a group of timed samples that is not associated with metadata related to layer organization are decoded based on the metadata provided by the default layer descriptor.

In an embodiment, one operating point descriptor is defined as a default operating point descriptor so that timed samples belonging to a group of timed samples that is not associated with metadata related to descriptive information are decoded based on the metadata provided by the default operating point descriptor.

In an embodiment, the data structure for referencing metadata is of the SampleToGroupBox type according to the International Standard Organization Base Media File Format.

In an embodiment, metadata referenced by the data structure and including definition of at least one group of timed samples are defined in a structure of the SampleGroupDescriptionBox type according to the International Standard Organization Base Media File Format.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Further advantages of the present invention will become apparent to those skilled in the art upon examination of the drawings and detailed description. It is intended that any additional advantages be incorporated herein.

Embodiments of the invention will now be described, by way of example only, and with reference to the following drawings in which:

FIG. 4, comprising

FIG. 5, comprising

FIG. 6, comprising FIGS. 6a, 6b, and 6c, illustrates an example of a bit-stream splicing application;

FIG. 11 illustrates new decoder configuration information according to the invention.

DETAILED DESCRIPTION OF EMBODIMENTS OF THE INVENTION

Figure 1:
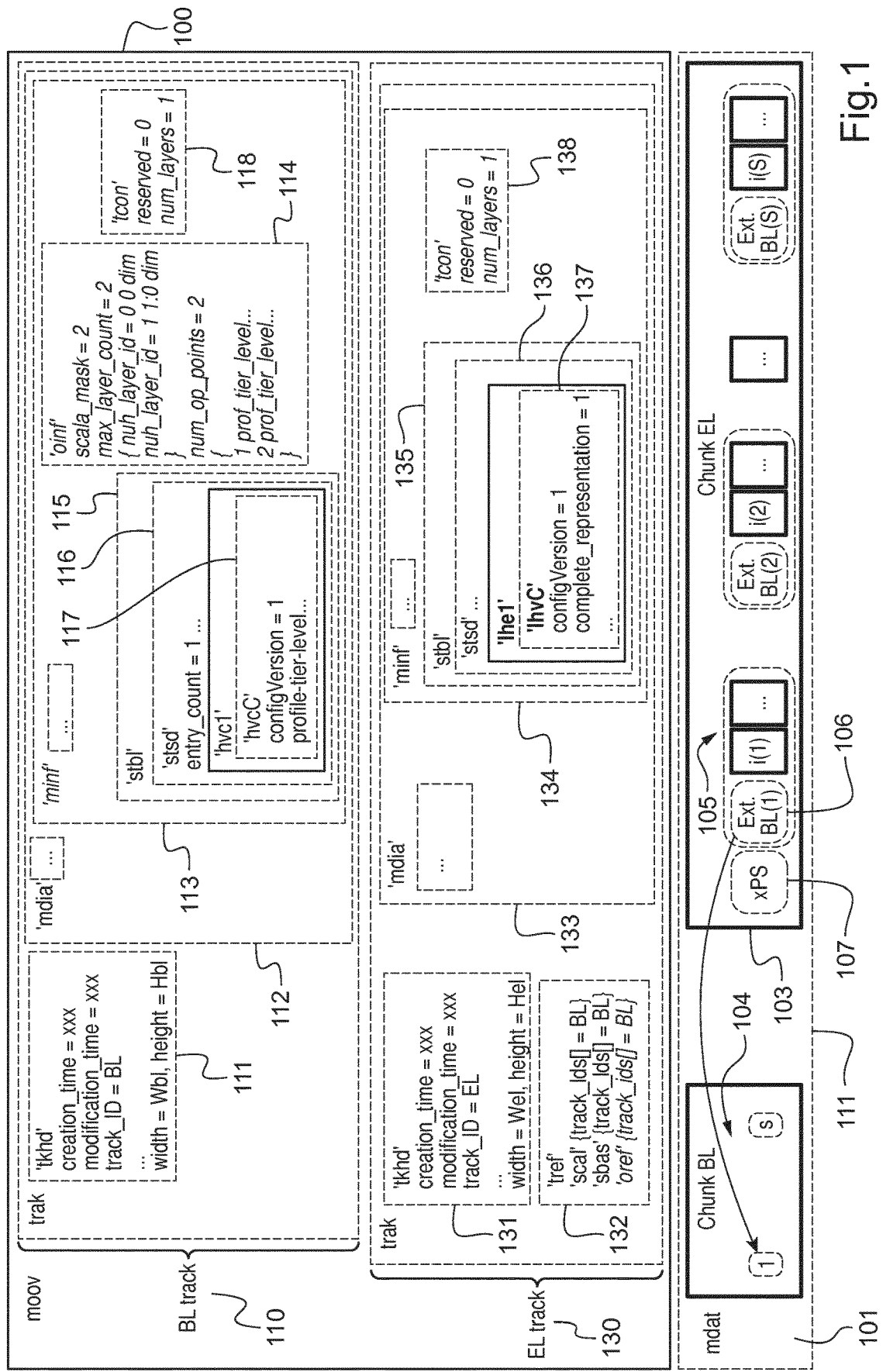
FIG. 1 illustrates an example of encapsulating two scalability layers according to the MPEG-4 file format.

The three parts below describe known information about three different features, respectively the spatial organization of pictures, the NAL units, and the specific descriptor called VisualSampleEntry. Those features are described here for a better understanding of the embodiments represented on FIGS. 1 to 3.

The Spatial Organization of Pictures

The video is preferably scalable or a multiview video and organized in different levels of scalability/views.

According to a particular embodiment, multi-layer partitioned timed media data such as multi-layer tiled timed media data (e.g. scalable or multiview tiled video data) comprising timed samples (e.g. images) are transmitted as a set of several timed media data tracks, typically base tracks and tile tracks. Still according to a particular embodiment, the base tracks comprise a base layer base track and at least one enhancement layer base track. Additional tile tracks may be base layer tile tracks and/or enhancement layer tile tracks. Each timed media data track comprises one spatial subsample (e.g. several NAL units) of several timed samples. Each video frame (timed sample) may be composed of independently decodable tiles corresponding to spatial sub-parts (spatial subsamples) of the video frame. In Layered HEVC, each video frame may be composed of dependently decodable layers corresponding to spatial sub-part (spatial subsamples) of the video frame. In addition in Layered HEVC each video frame may be composed of dependently decodable layers and each layer may be composed of independently decodable tiles (for a given layer) corresponding to spatial sub-parts (spatial subsamples) of the video frame.

A list is used to describe track dependencies (tiling, inter-layer and/or intra-layer dependencies). Such a set of timed media data tracks allows the selecting, composing, and efficient streaming of multi-layer spatial video tiles. Each track can be transmitted from a server device to a client device as a set of media segment files. An initialization segment file can be used to transmit metadata required to decode media segment files.

An embodiment of the invention can apply, for example, to the video format known as HEVC or Layered HEVC (also known as LHVC or multi-layer HEVC).

It is reminded that according to the HEVC standard, images can be spatially divided into tiles, slices, and slice segments. In this standard, a tile corresponds to a rectangular region of an image that is defined by horizontal and vertical boundaries (i.e., rows and columns). It contains an integer number of Coding Tree Units (CTUs). Therefore, tiles can be efficiently used to identify regions of interest by defining, for example, positions and sizes for regions of interest. However, the structure of an HEVC bit-stream as well as its encapsulation as Network Abstract Layer (NAL) units are not organized in relation to tiles but are based on slices.

In the HEVC standard, slices are sets of slice segments, the first slice segment of a set of slice segments being an independent slice segment, that is to say a slice segment whose general information stored within a header does not refer to that of another slice segment. The other slice segments of the set of slice segments, if any, are dependent slice segments (i.e. slice segments whose general information stored within a header refers to that of an independent slice segment).

A slice segment contains an integer number of consecutive (in raster scan order) Coding Tree Units. Therefore, a slice segment can be of a rectangular shape or not and so, it is not suited to represent a region of interest. It is encoded in an HEVC bit-stream for a slice segment header followed by slice segment data. Independent and dependent slice segments differ by their header: since a dependent slice segment depends on an independent slice segment, the amount of information of its header is smaller than the one of an independent slice segment. Both independent and dependent slice segments contain a list of entry points in the corresponding bit-stream that are used to define tiles or as entropy decoding synchronization points.

According to the HEVC standard, slice segments are linked to tiles according to rules that may be summarized as follows (one or both conditions have to be met):

- all CTUs in a slice segment belong to the same tile (i.e. a slice segment cannot belong to several tiles); and
- all CTUs in a tile belong to the same slice segment (i.e. a tile may be divided into several slice segments provided that each of these slice segments only belongs to that tile).

The NAL Units

As mentioned above, while tiles can be considered as an appropriate support for regions of interest, slice segments are the entities that are actually put in NAL units for transport over a communication network and aggregated to form access units (i.e. coded picture or samples at file format level).

It is to be recalled that according to the HEVC standard, the type of a NAL unit is encoded in two bytes of the NAL unit header that can be defined as follows:

```
nal_unit_header ( ) {
    forbidden_zero_bit
    nal_unit_type
    nuh_layer_id
    nuh_temporal_id_plus1
}
```

NAL units used to code slice segments comprise slice segment headers indicating the address of the first CTU in the slice segment thanks to a slice segment address syntax element. Such slice segment headers can be defined as follows:

```
slice_segment_header ( ) {
    first_slice_segment_in_pic_flag
    if(nal_unit_type >= BLA_W_LP && nal_unit_type <=
    RSV_IRAP_VCL23)
        no_output_of_prior_pics_flag
    slice_pic_parameter_set_id
    if(!first_slice_segment_in_pic_flag){
        if(dependent_slice_segments_enabled_flag)
            dependent_slice_segment_flag
        slice_segment_address
    }
    If(!dependent_slice_segment_flag){
    [...]
```

Tiling information is provided in a PPS (Picture Parameter Set) NAL unit. The relation between a slice segment and a tile can then be deduced from these parameters.

While spatial predictions are reset on tile borders (by definition), nothing prevents a tile to use temporal predictors from a different tile in the reference frame(s). Accordingly, to build independent tiles, motion vectors for the prediction units are advantageously constrained inside a tile, during encoding, to remain in the co-located tile in the reference frame(s). In addition, the in-loop filters (deblocking and sample adaptive offset (SAO) filters) are preferably deactivated on the tile borders so that no error drift is introduced when decoding only one tile. It is to be noted that such a control of the in-loop filters is available in the HEVC standard. It is set in slice segment headers with a flag known as loop_filter_across_tiles_enabled_flag. By explicitly setting this flag to zero, the pixels at the tile borders cannot depend on pixels that fall on the border of the neighbor tiles. When these two conditions relating to motion vectors and to in-loop filters are met, tiles can be considered as "independently decodable tiles" or "independent tiles".

The Specific Descriptor Called VisualSampleEntry

An existing sample grouping mechanism of the MPEG-4 Part 12 standard can be used to encapsulate tiles. Accordingly, a specific sample group description is created with a tile descriptor that is a specific kind of the standard VisualSampleGroupEntry descriptor. Sample grouping mechanisms are used for representing partitions of samples in a track. They rely on the use of two boxes: a SampleToGroup box ('sbgp') that describes the assignment of samples to sample groups and a SampleGroupDescription box ('sgpd') that describes common properties of samples within a particular sample group. A particular type of sample grouping is defined by the combination of one SampleToGroup box and one SampleGroupDescription box via a type field (grouping_type). Multiple sample grouping instances (i.e. pairs of SampleToGroup and SampleGroupDescription boxes) can exist based on different grouping criteria.

A particular grouping criterion related to the tiling of samples is used. This particular grouping type, called 'trif', describes the properties of a tile and is derived from the standard VisualSampleGroupEntry. It can be referred to as TileRegionSampleGroupEntry and is defined as follows:

```
class TileRegionGroupEntry ( ) extends VisualSampleGroupEntry ('trif') {
    unsigned int(16) groupID;
    unsigned int(2) independent_flag;
    unsigned int(1) full_picture;
    unsigned int(1) filtering_disabled;
    unsigned int(4) reserved=0;
    if (!full_picture) {
        unsigned int(16) horizontal_offset;
        unsigned int(16) vertical_offset;
    }
    unsigned int(16) region_width;
    unsigned int(16) region_height;
}
```

According to this particular type of group entry, parameter groupID is a unique identifier for the tile described by the group. Parameters horizontal_offset and vertical_offset are used to set a horizontal and a vertical offset, respectively, of the top-left pixel of the rectangular region represented by the tile, relative to the top-left pixel of the HEVC frame, in luma samples of the base region. Parameters region_width and region_height are used to set the width and height, respectively, of the rectangular region represented by the tile, in luma samples of the HEVC frame.

A parameter independent_flag is a 2-bit word that specifies that the tile comprises decoding dependencies relating to samples only belonging to the same tile, as described above by reference to the definition of independent tiles. For the sake of illustration and referring to a standard use of SEI messages (Supplemental Enhancement Information) for describing tile organization, the flag known as tile_section_exact_match_flag can be used to set the value of the independent_flag parameter whose meaning can be set as follows:

- if parameter independent_flag equals 0, the coding dependencies between this tile and other tiles in the same frame or previous frames is either described at the tile set level or unknown;
- if parameter independent_flag equals 1, there are no temporal coding dependencies between this tile and the other tiles with different groupID in any reference frames but there can be coding dependencies between this tile and the tile with the same groupID in the reference frames, and
- if parameter independent_flag equals 2, there are no coding dependencies between this tile and other tiles in the same frame, and no coding dependencies between this tile and any other tiles in the reference frames.

The independent_flag parameter value 3 is reserved.

The full_picture parameter, when set to 1, indicates that this tile region is actually a complete picture. In such a case, region_width and region_height shall be set to the layer luma size, and independent_flag shall be set to 1.

The parameter filtering_disable, when set to 1, indicates that no post-decoding filtering operation on this tile region requires access to pixels adjacent to this tile region, i.e. bit-exact reconstruction of the tile region is possible without decoding the adjacent tiles.

The properties of each tile are given once in the movie header ('moov' box) by defining, for each tile track, one SampleGroupDescription box ('sgpd') with the 'trif' grouping_type and a TileRegionGroupEntry. Tile properties can also be defined per track fragment. Such an mp4 track can be defined as a video tile track or tile track. According to the HEVC standard, an HEVC tile track is a video tile track for which there is a reference to an HEVC track carrying the other NALUs (typically set up information such as various parameter sets) of the HEVC layer to which the tile(s) in this track belong. The reference can use values already defined in the MPEG-4 Part 15 standard such as the 'sbas' four character code, or a more specific one such as 'tbas', to indicate tile base track.

One tile track shall either have one and only one TileRegionGroupEntry (illustrated in FIG. 8a) and no TileSetGroupEntry or one and only one TileSetGroupEntry and one or more dependent TileRegionGroupEntry from which this tile set is made, a TileSetGroupEntry being an extension of a TileRegionGroupEntry to described a set of tiles. It is to be noted that each of these groups is assigned a unique identifier, which can be used to associate a NALU to a group. Tile regions and tile sets share the same namespace for groupID, scoped by the base HEVC layer, as indicated by 'tbas' track reference (i.e. there shall not be two tile regions or tile sets with the same groupID in any tracks having the same base layer).

Introducing a new kind of track here, the tile track, implies to define the corresponding sample entries in order to comply with File Format design. Indeed, each track must contain among its descriptive data, a SampleTableBox ('stbl') with a mandatory SampleDescriptionBox ('stsd'). The sample description table gives detailed information about the coding type used, and any initialization information needed for the decoding of the track samples. Information stored in the SampleDescriptionBox is track specific and is described for video tracks by specializing the abstract description for any visual sample entry. Typically, any visual sample entry contains a "coding name" parameter providing the compression format decoder to use to handle the samples. This parameter must be a unique identifier encoded as a four character code. In order to describe the samples put in the tile tracks, we then have to describe these samples with a specific kind of VisualSampleEntry. The HEVCTile-SampleEntry is introduced, represented for example by the code 'hvt1' to indicate that an HEVC decoder with tile capabilities is required to process the samples of the tile track. Usually, in sample description table, a Configuration-Box is included as parameter to provide decoder configuration information. For the specific case of HEVC tile tracks, we do not duplicate the configuration box but rather inherits the one described in the tile base track indicated in the track reference type 'tbas' in the track header. Optionally, a parameter describing an average bitrate per tile can be set in the HEVCTileSampleEntry as well as profile, tier and level information. A profile defines a subset of the standard in terms of features, typically targeting application domains. Each profile defines tiers and levels. Tiers can be viewed as nested complexity levels, each level defining limits for some values like number of pixels, number of slices, tiles . . . . Organized into increasing complexity, a decoder than can handle the highest tier at a given level in a profile will be able to support any lower tier at same level or below in the same profile. It can be useful to store per-tile bitrate information in this box, so as to be provided to streaming client for an adaptation based on the bandwidth. As for most of mp4 boxes, the HEVCTileSampleEntry box can be extended with optional extra boxes to match application specific needs.

FIG. 1 illustrates an example of encapsulating two scalability layers according to the MPEG-4 file format. As illustrated, each layer (enhancement layer EL and base layer BL) is encapsulated in its own track, enabling efficient data addressing and leading to encapsulating the video as two tracks.

More precisely, FIG. 1 represents a movie box "moov" 100 containing all ISO BMFF metadata for a media data sequence encoded into a multi-layer HEVC bit stream and containing S samples. The same principles would apply to media data encapsulated with movie fragments or as segments as defined in b) and c) page 6.

A single "mdat" box 101 contains the whole encoded bit-stream organized into two chunks, one for the base layer 102 and one for the enhancement layer 103, each chunk containing the S samples 104, 105. For the enhancement layer EL, the chunkEL 103 comprises the corresponding portion of the encoded bit-stream for the S samples. Each sample is organized into one or more NAL units. Moreover a specific NAL unit is added at the beginning of the portion for including an extractor 106 in order to reference the corresponding portion in the base layer chunk. Finally, the enhancement layer chunk comprises the different parameter sets (summarized as "xPS" 107) for defining the parameter at a given "x" level, for example picture level (PPS) or sequence level (SPS).

The "moov" box 100 comprises two boxes "track", one being dedicated to a base layer track 110 (resulting from a base layer encapsulation) and one being dedicated to an enhancement layer track 130 (resulting from a enhancement layer encapsulation).

Each layer track describes its respective S samples illustrated in the mdat box 101.

The base layer track 110 comprises several boxes that are sequentially or hierarchically organized and that define parameters of the encoded above mentioned encoded portion of bit-stream. For the sake of clarity, only a selection of boxes is illustrated in FIG. 1.

A box or sub-box named 'tkhd' for track header 111 comprises the temporal, spatial and identifying information. The temporal information concerns the creation and modification times of the S samples (creation_time, modification_time). The identifier (track_ID) here equal to "BL", allows identifying the track. The spatial information comprises display size information (width and height) of the base layer.

Another box or sub-box named 'mdia' 112 is a media information description box and comprises information about the media data related to the S samples of bit-stream.

The 'mdia' box comprises some header boxes which are not represented for sake of clarity and a media information box 'minf' 113 which contains the descriptive information itself. In this example, the 'minf' box is sub-divided into three different boxes or sub-boxes.

A first box or sub-box 'oinf' 114 contains operation point information (also denoted operation point descriptor) such as the layers and sub-layers (for instance temporal sub-layers) and their organization constituting the operation point, dependencies (if any) between them, a prof_tier_level parameter reflecting the profile, tier and level information contained in the VPS of the HEVC bit-stream for the operation point. More in detail, the box 'oinf' comprises a parameter ((scala_mask) giving information about the scalability structure, the number of layers, here two (max_layer_count=2) and for each layer, an identifier, the list of dependent layers followed by the number of operation points in the file, each described by profile/tier and level information and by the set of layers composing this operation point, as illustrated with reference 800 in FIG. 8.

Figure 8:
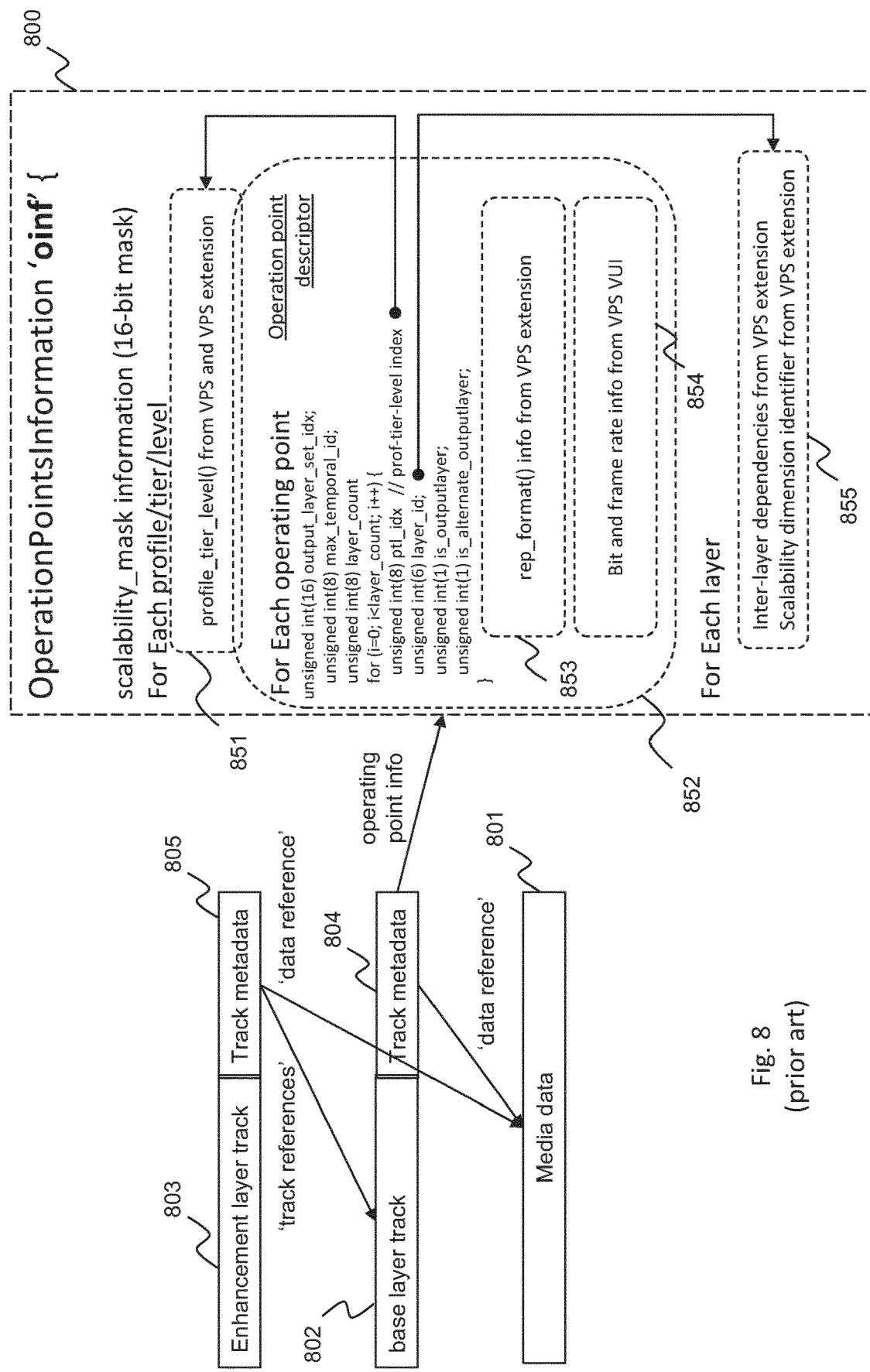
FIG. 8 illustrates a standard operating point descriptor.

FIG. 8 illustrates a standard operating point descriptor in operating point information 800.

As illustrated, media data 801 can be represented using a base layer encoded in base layer track 802 that comprises descriptive metadata 804 and using an enhancement layer encoded in enhancement layer track 803 that also comprises descriptive metadata 805.

Base layer track metadata 804 comprise data references to the media data 801. Enhancement layer track metadata 805 comprise data references to the media data 801 and track references to the base layer track, for example to signal some coding dependencies.

Operating point information 'oinf' 800 comprises information related to the track organization, in particular the organization of the operating points that are independently decodable subset of a multi-layer bit-stream like, for example, scalable HEVC or multi-view HEVC.

More precisely, operating point information 800 comprises a profile, tier and level information 851 from the VPS (Video Parameter Set) and VPS extension of the video bitstream, an operating point descriptor 852, and inter-layer dependencies from VPS extension and scalability dimension identifier from VPS extension denoted 855. Operation point descriptor 852 comprises representation format information from VPS extension 853 as well as bit and frame rate information from VPS VUI (Video Usability Information) denoted 854.

A second box or sub-box called 'stbl' box 115 for Sample Table Box contains information describing the samples for each track. Part of the information, relative to the High Efficiency Video Coding (HEVC) method, is included in an 'stsd' box 116 or sub-box for Sample Description Box. The parameter "entry_count" indicates that only one (Visual) Sample Entry is included. The four bytes 'hvc1' indicate that the bit-stream corresponding to the considered media data is compliant and usable by an HEVC decoder operating under the configuration (including profile, tier, and level) given in a HEVCDecoderConfigurationRecord defined below in the 'hvcC' box 117. In this example, the version configuration is the first one (configVersion=1). The HEVCDecoderConfigurationRecord also gives the profile, tier and level information contained in the Video Parameter Set of the HEVC bit-stream.

The third box or sub-box named 'tcon' 118 lists all the layers and sub-layers carried in the track, here only one (num_layers=1). The reserved parameter always has the 0 value for further evolution of the box.

According to an embodiment, the 'tcon' box is optional, the optionality being signaled in FIG. 1 by the use of italic type. For example, when there is only one enhancement layer, 'tcon' 118 is not present in the file.

Other information related to the organization of the layers may be optional like the different kinds of sample entries: 'shv1', 'she1', 'shvC' and any four character code for scalable HEVC only as well as the 'mhv1', 'mhe1', 'mhvC' and any four character code dedicated to only multiview HEVC sample entries. These codes correspond to tracks having a single scalability type identified. For the tracks having more than one single scalability type (for example both SNR and view dimensions) or for tracks that are non-output layers only one or two kinds of sample entries can be kept: 'lhv1', 'lhvC' or 'lhe1' for example or any four character code to describe layered HEVC samples entries.

The other track is dedicated to the enhancement layer 130. It comprises a track header box 'tkhd' 131 or sub-box which is similar to the 'tkhd' box of the base layer track, expect that the track_ID is "EL" for enhancement layer.

The track for enhancement layer comprises a Track Reference Box 'tref' 132 or sub-box. It provides a reference from the containing track here the enhancement layer track to another track, here the base layer track, in the presentation.

A first reference 'sbas' indicates that the track of the base layer 110 is the base track for the enhancement track 130. (track_ids[ ]=BL).

Another reference 'oref' allows referring to the 'oinf' box (operating point descriptor), here put in the base layer track. The 'oref' reference is written by using italic type. Indeed as explained below, 'oref' track reference type may be optional if there is only one reference layer, in case the 'oinf' box is not present in the base layer track.

As for the base layer track, the enhancement layer track comprises a 'mdia box' 133 including an 'miff' box 134. This 'miff' box comprises an 'stbl' box 135 itself including an 'stsd' box. This last box comprises four bytes 'lhe1' for example, which indicate that the bit-stream corresponding to the considered media data is compliant and usable by an L-HEVC decoder operating under the configuration (including profile, tier, and level) given in configuration box defined below in the 'lhvC' box 137.

This 'lhvC' box is described more in detail below.

Finally as for the base layer track the 'mdia' box comprises an optional 'tcon' box 138.

According to the embodiment mentioned above, based on a predefined condition (for example only one enhancement layer, in its own track) the 'tcon' box can be removed from the track. This can be the case when there are multiple layers provided that they are encapsulated in their own tracks.

It is to be noted that having one layer per track leads to several advantages. First of all, it simplifies filtering of the layered content, as a track is either used or unused during the filtering; the multi-layer per track imposes sample inspection in case the track contains a mix of layers used by the desired OP and layers not used by that OP.

Moreover, a single scalability dimension is present in the track in such a case. This allows using simplified code-points (shc1/...) to indicate the type of track, and simplifies the mime type derivation, without relying on profile and levels to identify the type of scalability.

Finally, having one layer per track makes it possible to improve alignment with MPEG-2 TS carriage of L-HEVC where stream types are defined for each type of scalable content and a single layer is allowed in a track.

However, having a single layer per track has several drawbacks.

First of all, since non-output layers have to be in their own track, they waste storage as 'stbl'/'trun' boxes will be duplicated. However, it may be considered that such a case (according to which a layer that is never an output layer) is quite limited.

It is also to be noted that having a single layer per track does not allow the cases according to which a base layer is stored in one track and all enhancement layers are stored in another track or the cases according to which all base/lhevc are stored in one track. This is why alternative embodiments are considered with one layer per track leading to either the modification of the LHEVCDecoderConfigurationRecord as described with reference 1100 in FIG. 11 or the use of a dynamic 'tcon' box as described by reference to FIG. 9.

In the case according to which the 'tcon' box is removed, layer structure information is stored in the LHEVCDecoderConfigurationRecord (reference 1100 in FIG. 11) as follows: an indication of the layerID conveyed by the track denoted 1101 in FIG. 11. The min and max temporal sub-layer are removed as they cannot be used by 'oinf' to select some layers. It is to be noted that it is still possible to use the temporal grouping mechanism (for example the 'tscl' grouping type) defined for (single layer) HEVC.

More generally, the 'tcon' box is optional if each layer meaning the base layer and each one of the several enhancement layers are encapsulated into a separate track. Indeed, for typical configurations when one layer corresponds to one operation point, this box does not provide any useful information: the 'tcon' box just indicates that there is one layer in the track. The list of dependent layers (i.e. tracks in this case) can be found via the Track Reference Box. The 'tcon' box may be only useful when one track results from the encapsulation of several layers.

According to a preferred embodiment, for a set of tracks with a common 'sbas' track reference, there is at most one track among this set that carries information of the 'oinf' box. All tracks with a common 'sbas' referenced track can also be linked to the track that carries information of the 'oinf' box by using the 'oref' type track reference.

There are two options here: either discard the 'oref' type and mandate that the 'oinf' information be in the base track, as indicated by the 'sbas' track reference (in case of hybrid coding (AVC base track+HEVC enhancement track), this means that the sample group 'oinf' would be allowed on an AVC track); or, if not possible, keep the 'oref' to signal which track contains the sample group and sample group description boxes indicating the 'oinf' information.

FIG. 11 illustrates new decoder configuration information according to the invention. As illustrated, layer structure information is stored in the LHEVCDecoderConfigurationRecord 1100 that comprises an indication of the layerID conveyed by the track, denoted 1101.

Allowing information to change over time in the ISOBMFF can be done by using a dedicated track, sample entries, or sample groups, being noted that the layer configuration is currently provided by 'oinf' and optionally the 'tcon' boxes.

Figure 7:
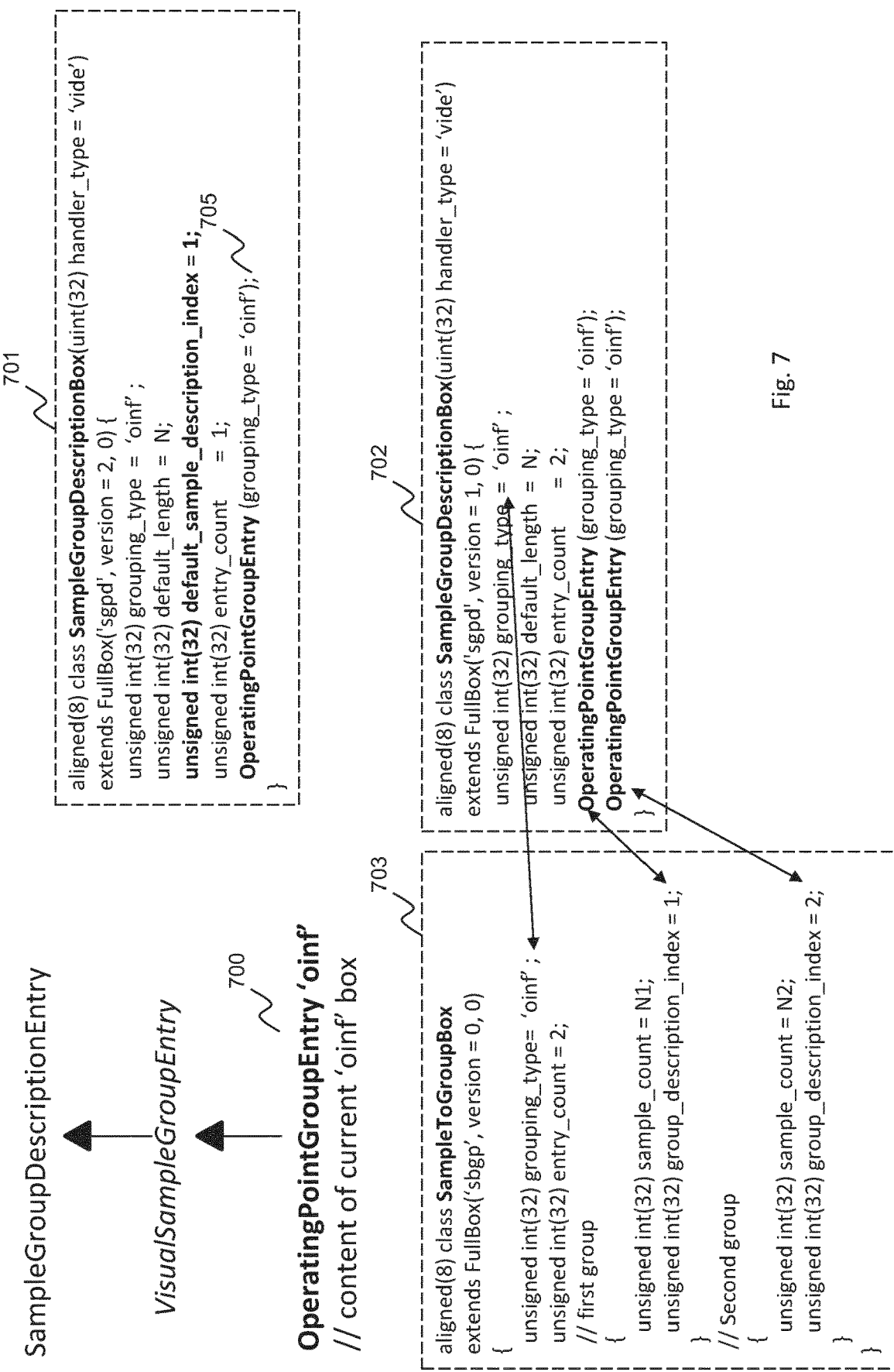
FIG. 7 illustrates a specific and dynamically extensible descriptor for operating points according to embodiments of the invention.

According to embodiments, these boxes are moved out of the 'minf' box and inherit data from the VisualSampleGroupEntry class as shown in FIG. 7.

FIG. 7 illustrates a specific and dynamically extensible descriptor for operating points according to embodiments of the invention.

As illustrated in FIG. 7, operation point information can be obtained using the new OperatingPointGroupEntry 700 by specializing the abstract VisualSampleGroupEntry.

According to that embodiment, the 'oref' type referenced track would contain the sample group box 703 and the sample group description boxes 702 or only the sample group description box 701 in case of default sample grouping. The sample group description box 701 illustrates a case according to which the samples of the tracks that are not mapped into any group of samples inherit the sample properties of the group of sample having index 1 (default_sample_description_index=1).

The OperationPointGroupEntry (e.g. OperationPointGroupEntry 705) provides, for the corresponding samples as defined in the sample group box 703, the set of information to be used, according to the definition given in the standard 'oinf' structure (such as the standard 'oinf' structure 800 described by reference to FIG. 8).

The example illustrated in FIG. 7 wherein the sample to group box 703 is associated with the sample group description box 702 via the grouping_type called 'oinf' (it is to be noted here that this code is only given for the sake of illustration, any four character code reserved to indicate an operation point group entry can be used) shows two sample groups resulting from stream splicing with different operating points as described by reference to FIG. 6 (reference 603).

Naturally, one of the two sample group description entries can be the sample group description defined by default so that only one specific sample group description entry is to be defined. In other words, it is possible to associate the first N1 samples with a specific sample group description and to associate the other samples (i.e. the samples that are not mapped into an 'oinf' group) to the default sample group description.

Likewise, since layer organization inside a track can vary along time, the 'tcon' box can be modified similarly (i.e. moving from 'minf' box to a new grouping_type and new VisualSampleGroupEntry) when dynamic update is needed.

Figure 9:
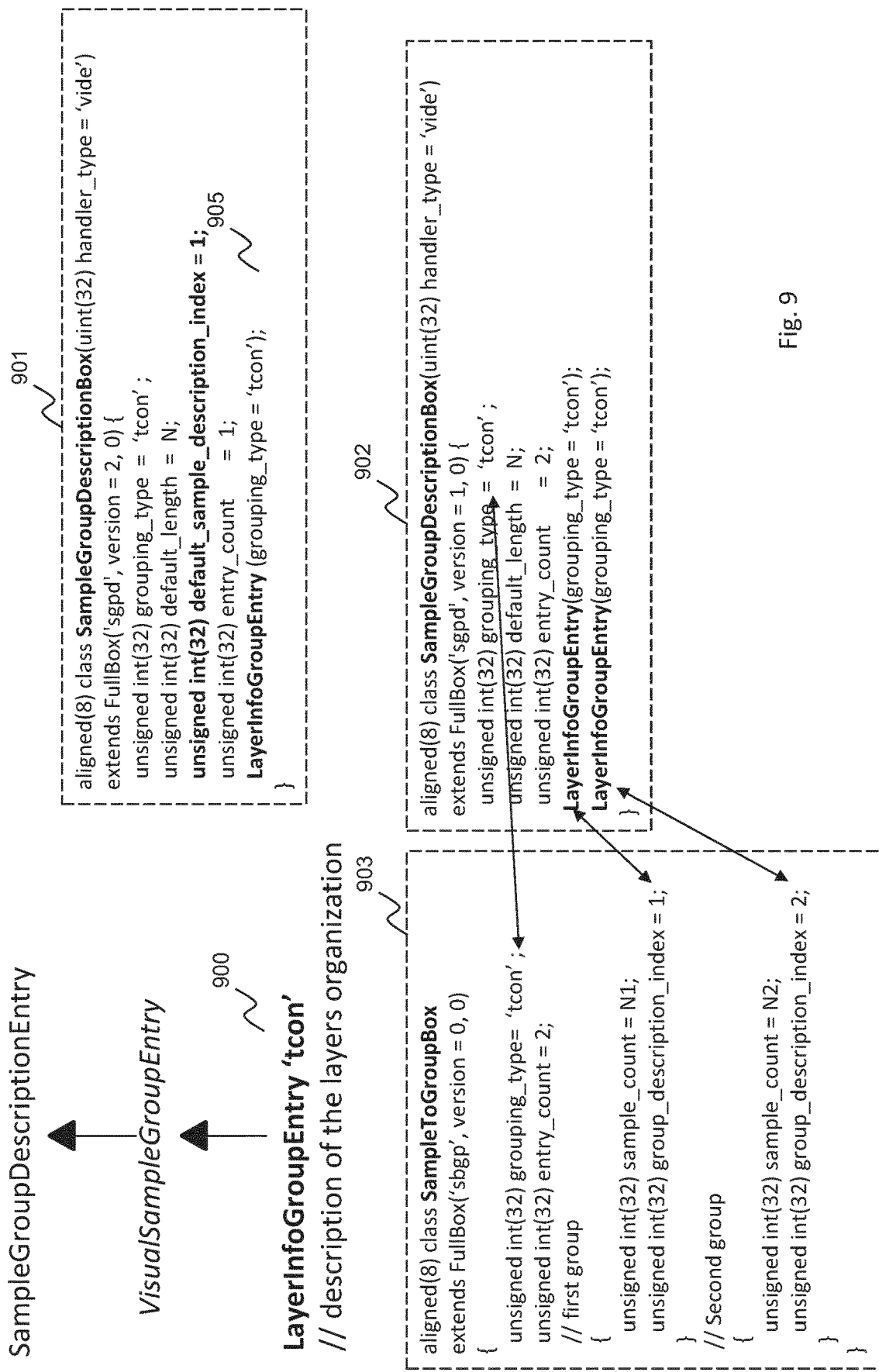
FIG. 9 illustrates a specific and dynamically extensible descriptor for layer information description.

As illustrated in FIG. 9, a new LayerInfoGroupEntry 'tcon' 900 can be used to that end. Again, the four character code 'tcon' is only given for the sake of illustration, as well as the name of the specific entry (could be also TrackContentGroupEntry)

The LayerInfoGroupEntry 'tconf' can be defined as follows:

```
class LayerInfoGroupEntry extends VisualSampleGroupEntry ('tcon')) {
  unsigned int (2) reserved;
  unsigned int (6) num_layers_ in_track;
  for (i=0; i<num_layers_in_track; i++) {
    unsigned int (4) reserved;
    unsigned int (6) layer_id;
    unsigned int (3) min_sub_layer_id;
    unsigned int (3) max_sub_layer id;
  }
}
```

FIG. 9 illustrates a specific and dynamically extensible descriptor for layer information description.

Again, the 'oref' type referenced track would contain the sample group box 903 and the sample group description boxes 902 or the sample group description boxes 901 in case of default sample grouping.

For a track having a constant layer organization, the default sample grouping could be used. In case the layer organization varies along time, as described by reference to FIG. 6 (e.g. in bit-stream splicing 603), a sample group box can be defined to map samples to their appropriate layer to track organization. For the sake of illustration, the first N1 samples as defined in groups 903, that may correspond to the samples of stream 601 that are combined with samples of stream 602 in stream 603 in FIG. 6, and the remaining N2 samples, that may correspond to the samples of stream 602 that are combined with samples of stream 601 in stream 603 in FIG. 6, can be associated with different layer information group entries in sample group description box 902.

Again, one of the two sample group description entries can be the sample group description defined by default so that only one specific sample group description entry is to be defined. In other words, it is possible to associate the first N1 samples with a specific sample group description (specific layer information group entry) and to associate the other samples (i.e. the samples that are not mapped into any sample group with the 'tcon' grouping_type) to the default sample group description (another layer information group entry).

Figure 10:
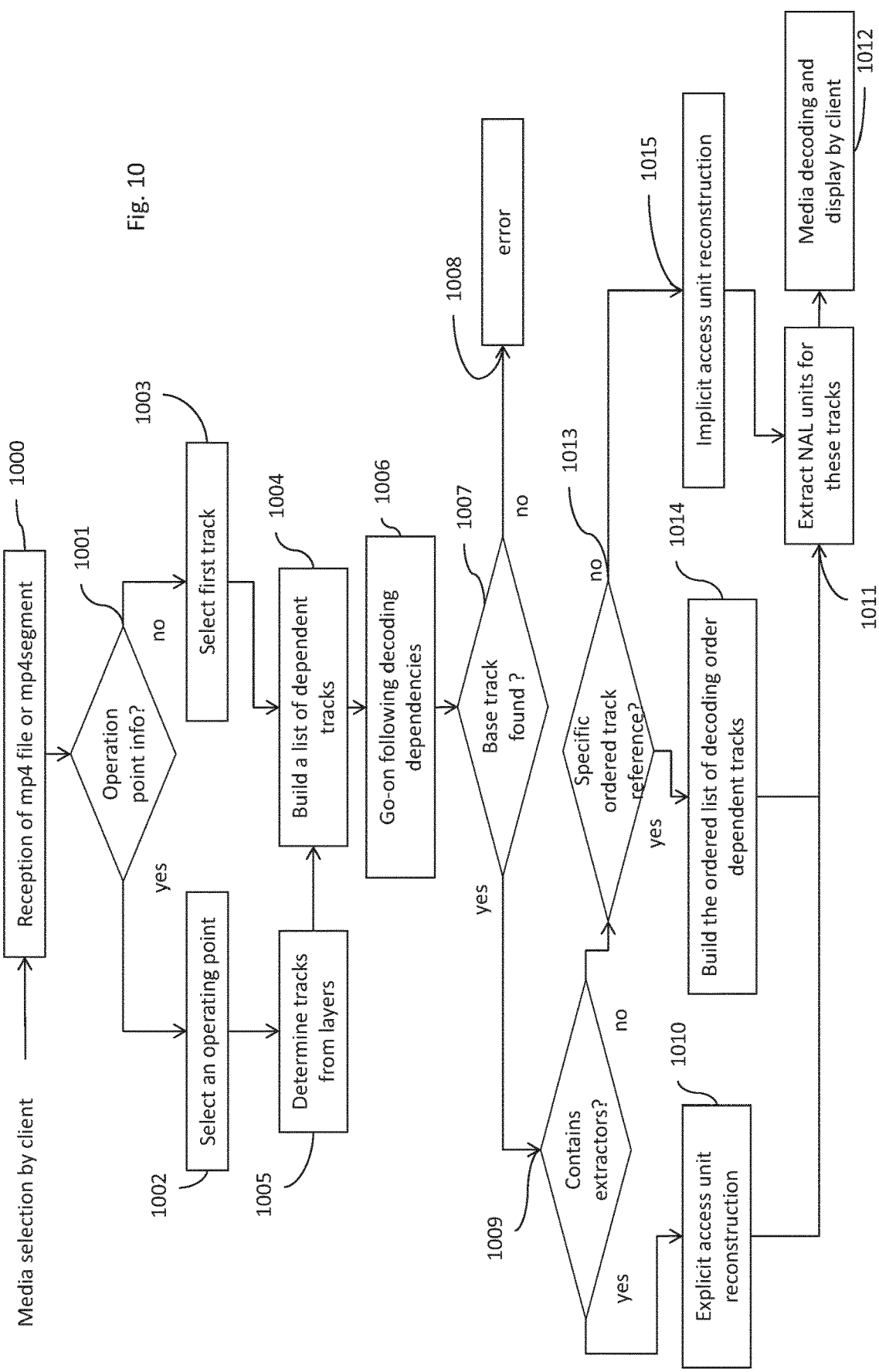
FIG. 10 illustrates the processing at the client's end for media files encapsulated according to the invention.

FIG. 10 illustrates the processing at the client's end for media files encapsulated according to the invention.

As illustrated, the client device receives an mp4 (or ISOBMF) file or mp4 (or ISOBMF) segment in a first step (step 1000). It is interpreted or parsed (i.e. read or decoded) by an mp4 parser (or mp4 reader). In case of segment-based delivery, the reception is an iterative process from a first initialization segment to the last segment of the media presentation. For an mp4 file, all data may be available at file reception.

A following step 1001 consists for the mp4 parser to look for operating point information. Indeed, in order to reconstruct an access unit from samples of one or more L-HEVC tracks, the target output layers and the operating point they belong to may need to be determined first. This can be done by parsing the descriptive metadata under the 'moov' box (or 'moof' boxes in case of mp4 segments).

According to a preferred embodiment, the parser builds an internal list of tracks in memory from all the 'trak' boxes it encounters. From these tracks, if at least one track is referenced as an 'oref' track, this is the one that should contain information on the operating points available in the file (or list of segments). The metadata boxes describing this track are then parsed, especially the sample table box to look for some sample to group box having a grouping type indicating operation point information.

This can be for example the 'oinf' code according to a preferred embodiment (for example the sample group box 703 and the sample group description boxes 702 or the sample group description box 701 in case of default sample grouping as described by reference to FIG. 7. It can be any reserved unique (i.e. non already used for other purpose) four character code.

If such a sample group (references 703 and 702 in FIG. 7) or at least default sample group (reference 701 in FIG. 7) is found (i.e. test 1001 is true), the track selection is based on operation points parameters (step 1002).

On the contrary, if test 1001 is false, a default track is selected (step 1003). It can be, for example, the first track in the file or the one with lowest "layer" value in the track header box. Alternatively, all the tracks are presented to the user and the player waits for user selection.

It is assumed that the selected track is a simple track only with potentially coding dependencies that can be found from its track reference box Oren at step 1004.

When one or several tracks to play are selected from an operation point information (step 1002), a list of layers can be identified from the operation point info group entry. The next step for the client device is then to identify the tracks into which the identified layers are encapsulated (step 1005). This can be done by parsing the track description boxes either via

- the track content information box 'tcon' according to the current version of the layered HEVC file format described in w15182,
- according to the embodiment described by reference to FIG. 9 through the sample group description, looking for a grouping type with 'tcon' value (or any reserved and unique four character code indicating layer information for the samples or a group of samples of a track), or
- according to another embodiment, where one track corresponds to one single layer, by parsing information (step 1101) from a modified LHEVCDecoderConfigurationRecord (reference 1100 in FIG. 11) in the 'lhvC' box for the tracks to identify whether or not the layer corresponds to the track. The new layer_id parameter denoted 1101 in FIG. 11 indicates the value of the nuh_layer_id of VCL NAL units contained in the samples associated with this sample entry. This value shall be 0 if the flag complete_representation denoted 1102 in FIG. 11 is set to 0, as the track only contain extractors and aggregators in such a case.

The mapping from layers to track is performed during step 1005, being observed that the parser has obtained (during step 1002) a list of dependent layers onto which the layers of the operation point depend (as described by reference 855 in descriptor 800 of FIG. 8).

The obtained tracks for the operation points plus the dependent tracks corresponding to dependent layers are used to form a list of inter-dependent tracks during step 1004. To know the nature of these dependencies, the parser examines the track reference boxes of the obtained tracks in step 1006.

A specific track, called the base track, should be found in step 1007.

This specific track is the track from which to start the access unit reconstruction. If none can be found this is an error and the player terminates for example with an error message indicating an invalid media file (step 1008).

If a base track referenced to via the 'sbas' track reference type can be found, the parser starts sample reconstruction from this one at the time given by the user (may necessitate some navigation in the sample table box to identify the first sample).

First, a test is performed to determine whether or not this first sample contains extractors (step 1009). If extractors are present, this should be indicated with a 'scal' track reference type from the found base track to the referenced track from which to copy sample data, the reconstruction of the sample is explicit, simply consisting in resolving the extractors, i.e. replacing the extractor NAL unit by the NAL unit data pointed to by the extractor.

This is done in step 1010 for every sample of the track to produce the list of NAL units representing the track in step 1011 and finally producing a video bit-stream in step 1012 that can be decoded and displayed by the client device.

Figures 4A, 4B:
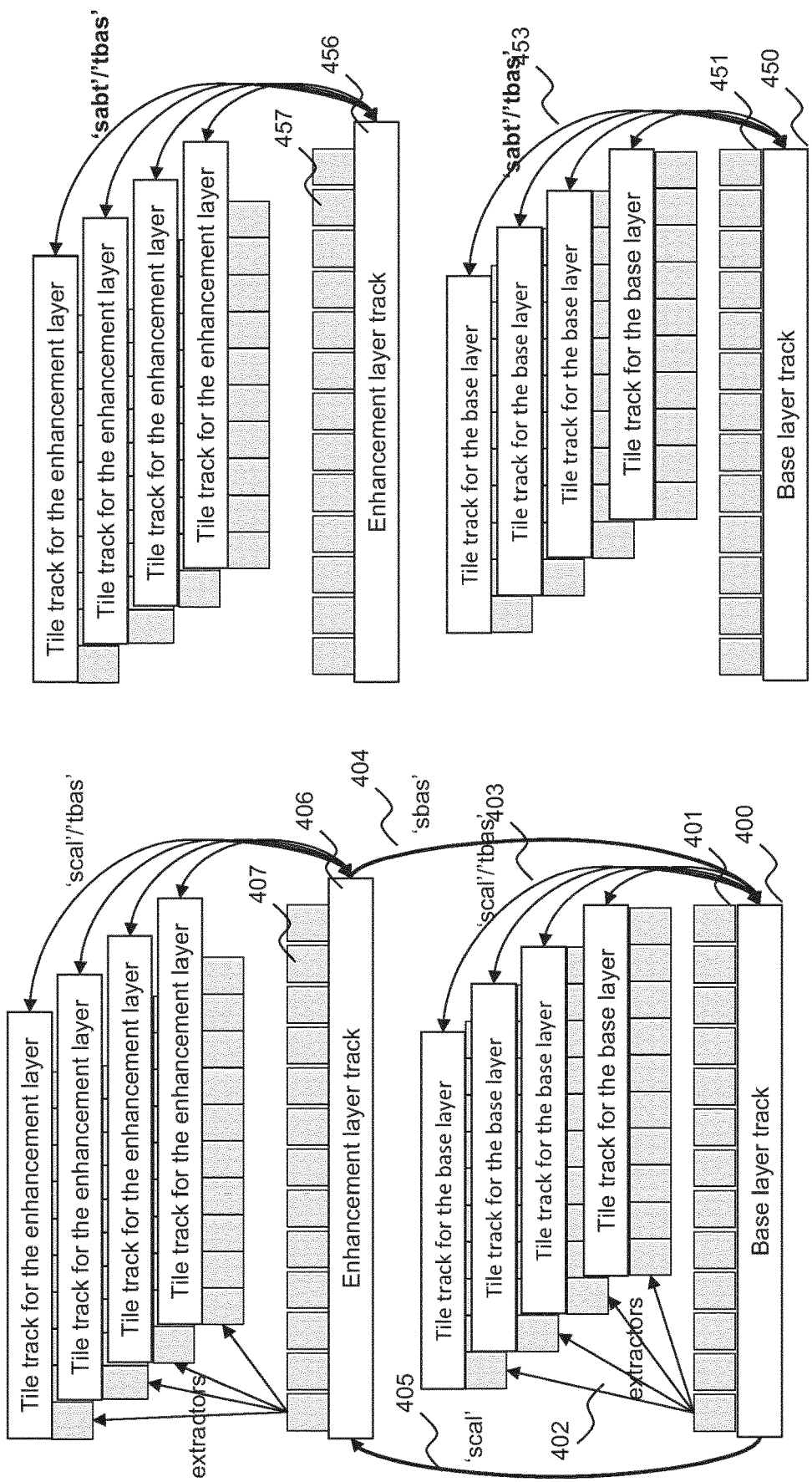
FIGS. 4a and 4b, illustrates examples of alternative track and tile tracks dependency signaling.
Figures 5A, 5B:
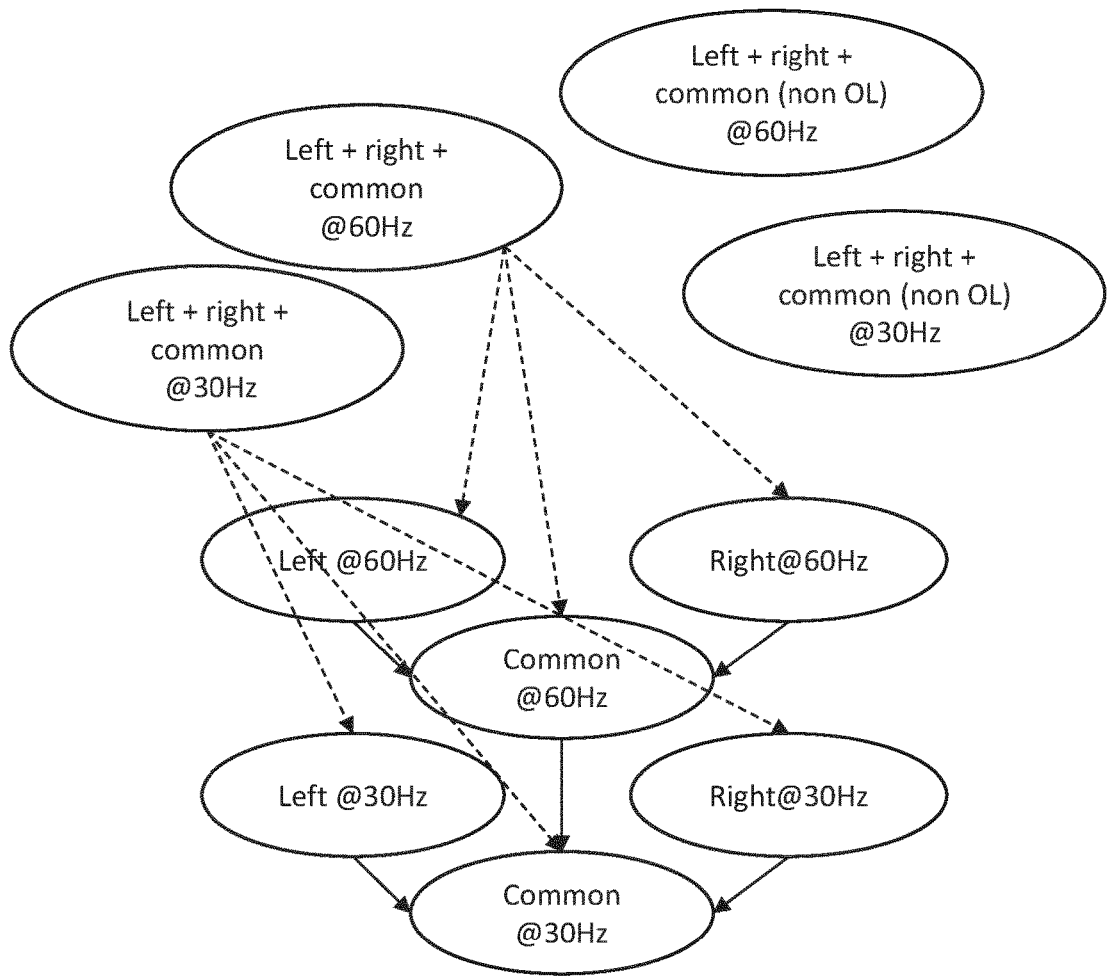
FIGS. 5a and 5b, illustrates examples of a layer configuration where a non-output layer is involved.

For the sake of illustration, this can be applied to the base layer 400 of the tile bit-stream represented in FIG. 4a.

On the contrary, if no extractor is found in step 1009, the parser checks at step 1013 whether or not there are some specific ordered track references in the track reference list associated with the base track (like for example the 'sabt' described by reference to FIG. 4b described herein after).

If a specific ordered track reference is identified at step 1013, an ordered list of decoding order dependent tracks is built at step 1014.

On the contrary, if no specific ordered track reference is identified at step 1013, an access unit is reconstructed from the respective samples in the required tracks, as indicated by the Operation Point Information Box, by arranging their NAL units in an order conforming to ISO/IEC 23008-2 (HEVC standard). This is the implicit access unit reconstruction of step 1015. Optionally, this indication on implicit or explicit reconstruction can be placed on one of the reserved bit of the LHEVCDecoderConfigurationRecord denoted 1100 in FIG. 11, just before the layer_id denoted 1101.

As an alternative, specific sample entries could be defined for tracks with implicit reconstruction and for tracks with explicit reconstruction in order to guarantee that extractors, in case of explicit reconstruction, would be resolved by the mp4 parser and not provided without resolution to a video decoder.

Whatever the reconstruction means, the parser has to consider all the samples of the tracks involved in the operation points and to concatenate their samples (NAL units) in step 1011 so as to form a decodable bit-stream in step 1012.

It is to be noted that the selection step (1001) can depend on the time of the first sample to play in the file. For example, in a stream resulting from the recording of spliced-stream as described by reference 603 in FIG. 6, the time of the sample will lead to one or another OperationPointInfoGroupEntry in the sample group description box (such as the sample group description box 702 in FIG. 7) of the track referenced as the 'oref' track, depending on where the player starts.

Figure 12:
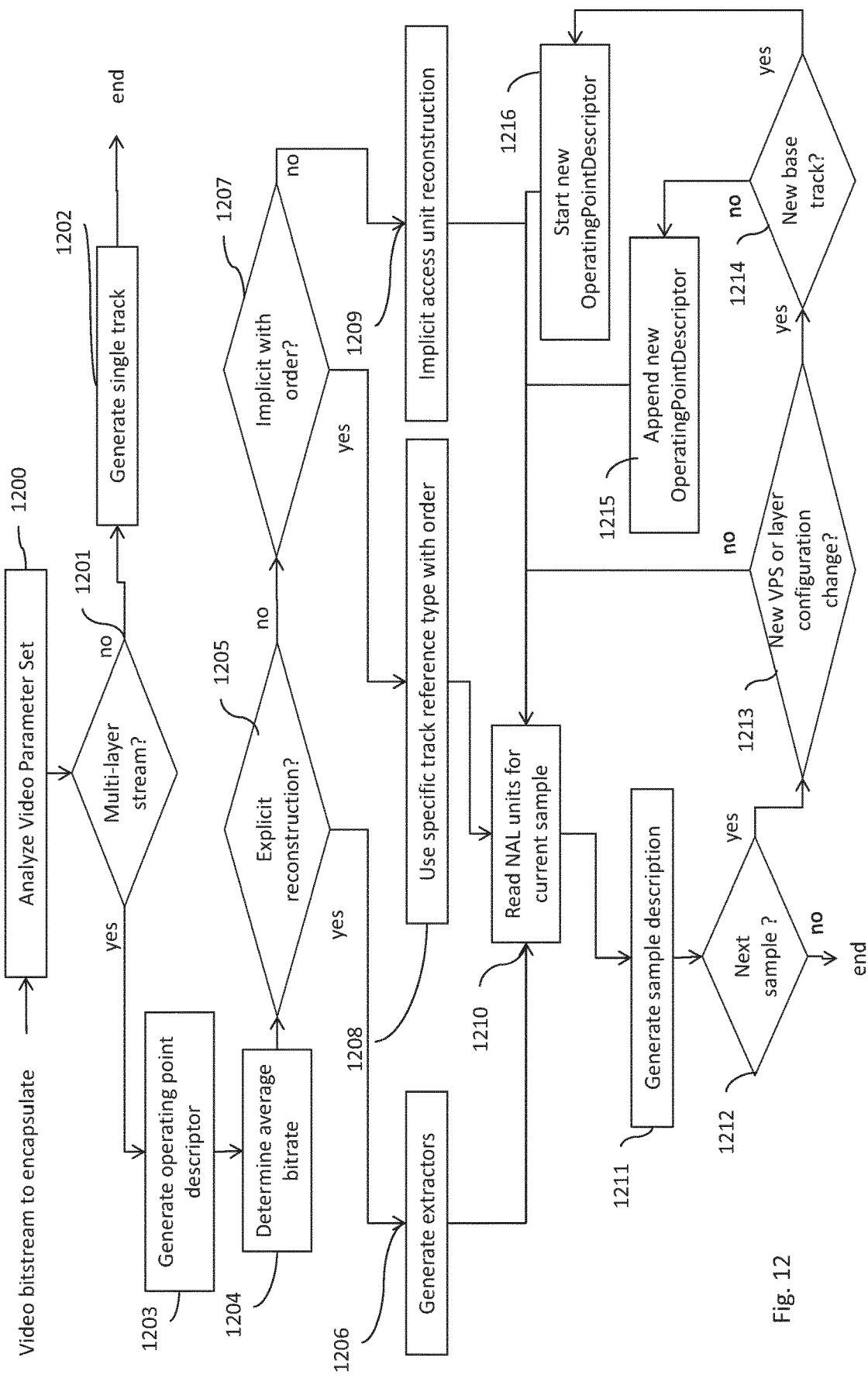
FIG. 12 illustrates the processing at the server's end for video bit-stream encapsulation according to the invention.

FIG. 12 illustrates the processing at the server's end for video bit-stream encapsulation according to the invention.

The encapsulation that is done using the algorithm described in FIG. 12 can be done in order to prepare the stream for adaptive streaming on HTTP or streaming on RTP by adding hint tracks or for local storage/recording. The encapsulation is handled by an mp4 writer taking as input one or more encoded media streams to generate either one mp4 file or a list of mp4 segments.

It is to be noted that if the description is directed to video stream encapsulation, the use of operation point and the signaling of dependencies also apply for other layered media types.

A first step (step 1200) of the mp4 writer consists in parsing the high level description parameters of the video bit-stream like for example the VPS (VideoParameterSet), VPS_VUI (Video Usability Information) and VPS extension in HEVC. From the video parameter set, the mp4 writer can deduce a degree of complexity, in particular if the stream contains multiple operating points and many layers with dependencies. From this number of layers, the mp4 writer deduces the number of tracks it will generate, assuming one layer in its own track.

In the case of multi-layer stream (i.e. if test 1201 is true), the mp4 writer fills an operating point descriptor during step

1203 by placing VPS and VPS extension parameters into a descriptor like the descriptor referenced 800 described by reference to FIG. 8.

In the meantime, the mp4 writer initiates the construction of a base track corresponding to the base layer in the video bit-stream, i.e. to the NAL units having a nuh_layer_id equal to 0.

Such a base track construction is also performed in case of a single layer bit-stream (i.e. if test 1201 is false) to generate the single track that is encapsulated (step 1202).

The other tracks (corresponding to the number of layers) are also initiated, typically by setting a layerID value, for example the layer_id 1101 of the LHEVCDecoderConfigurationRecord information 1100 illustrated in FIG. 11, and referencing the base track via a 'sbas' reference track.

The step 1203 related to operating point information descriptor mainly consists in creating the hierarchy of 'trak' boxes and in particular the sample table box with a default OperatingPointGroupEntry (e.g. reference 701 in FIG. 7) having the VPS and VPS extension parameters. By default, no Sample To Group box (like reference 703 in FIG. 7) is created.

From the VPS, VPS_VUI and VPS extension parameters, the mp4 writer is aware of an average bitrate in step 1204 via the avg_bit_rate parameter (if not present, the mp4 writer can roughly estimate the size of the whole stream divided by the number of samples to deduce an average bit rate).

It then decides in 1205 whether to use extractors (explicit reconstruction) or not. For example, knowing the number of layers and the number of samples, it can estimate whether the 12 bytes per extractor, per sample, and per dependent track will increase the size of the file above a given percentage with respect of the input video bit-stream.

For the sake of illustration, the mp4 writer can be parameterized so as to use extractors when the corresponding overhead does not increase the size of the bit-stream over 5%.

This decision and threshold can be user-decided if the encapsulation is interactive: the mp4 writer estimates the overhead, provides it to the user who can decide whether to encapsulate the bit-stream using extractors or not.

If the overhead remains acceptable (or if the user chooses to use extractors), the mp4 writer activates the extractor generation mode in step 1206. According to that mode, an indication for explicitly indicating how to reconstruct the samples is generated for each sample of each track having dependencies.

On the contrary, if the overhead is too important, the mp4 writer considers an implicit reconstruction mode, meaning that the reconstruction of the samples is to be deduced from track references only.

To that end, the mp4 writer checks at step 1207 whether or not the layer dependencies are sufficient to guarantee the correct order of the NAL units or whether ambiguity remains (for example when encapsulating tiles in separate tracks). If an order is to be indicated, the mp4 writer links concerned tracks (tiles and tile base track, for example as illustrated in FIG. 4*b*) with a specific track reference type implying a concatenation order (like the 'sabt' one for example).

At the opposite, if no order is to be specified (i.e. test 1207 is false), the mp4 writer does not specify any specific track reference relying on the following reconstruction rule: for a given time, order NAL units in increasing nuh_layer_id.

Once the reconstruction method is decided, the mp4 writer starts reading the NAL units and indicates the sample information in the sample table box (e.g. timing, byte offsets in the data, and the like).

In the case according to which extractors are used and if a track depends on another one, a sample of this track references the data in the referenced track using extractors (via a 'scal' track reference type).

The mp4 writer performs the sample description and encapsulation process until all the samples have been processed (i.e. test 1212 is false).

From one sample to another, if the mp4 writer detects a new VPS, a new VPS extension, or a change in the layer configuration (for example change in the greatest nuh_layer_id), in step 1213, the mp4 writer checks whether or not there is a new base track or not (test 1214). This could be the case when encapsulating multiple media streams in the same file: a set of tracks already exists in the mp4 file, in particular one having a layer_id equal to 0 and a new video bit-stream is to be encapsulated, for example an alternative independent video bit-stream also having NAL units with a nuh_layer_id value of 0.

A new base track leads to the creation of a new operating point descriptor during 1216 with a default sample group description box (for example default sample group description box 701 in FIG. 7). If the configuration changes but there is no new base track (i.e. test 1214 is false), the base track sample groups are modified during 1215 to create a new OperationPointGroupEntry (e.g. one OperationPointGroupEntry in 702 on FIG. 7) and to update (or create if does not exist yet) the associated sample to group box 703 with the grouping type 'oinf' (or reserved four character code). This is repeated iteratively until the last sample is reached.

At the end, the mp4 writer produces an mp4 file with track description and their dependencies.

This processing performed at the server's end can also be performed at the receiver's end for recording a streamed media file, for example as mp4 segments. The server may have prepared in the metadata part of some mp4 segments (the 'moof' box) description of the layer configuration so that when switching from one stream to another, the receiver is informed about the current layer configuration and can update its operating point descriptor by adding or creating new sample to group and associated description of grouping type 'oinf' (or dedicated four character code), as described by reference to step 1213.

According to an embodiment that is an alternative to the one described by reference to FIG. 7, a specific track is allocated with samples conveying information from the operation point information descriptor (e.g. operation point information descriptor 800 in FIG. 8). Most of the track samples would then be empty. This track is declared with specific sample entries, for example 'lhvp' for Layered-HEVC parameter set stream. A Layered HEVC stream sample entry contains an LHEVC parameter stream configuration as follows:

```
class LHEVCParameterSampleEntry( ) extends VisualSampleEntry
('lhvp'){
   LHEVCConfigurationBox   config;
   Box extra_boxes[ ];
}
```

This track shall be referenced by other tracks using the same operation points with the specific 'oref' track reference type. There shall be only one such tracks for a set of track sharing the base track via a 'sbas' track reference type.

Another alternative embodiment to the one described by reference to FIG. 7 is to keep the static 'oinf' (e.g. 'oinf' 800 in FIG. 8) in the 'minf' box but to make it possible to change some parameters when, for example, new layers are appended to the media presentation. This requires mp4 parser and writer an additional means for profile configuration comparison in order to append the different ones to this extensible version of 'oinf' box.

To that end, the mp4 writer needs a specific module to compare operating points. When a new operating point is detected from a VPS, the mp4 writer compares, parameter by parameter, the new operating point with the ones already stored in the static 'oinf' box. If at least one parameter differs, a new entry is created in oinf for this operating point and the number of operating points is incremented.

Similarly, the layer information is updated assigning new layer identifiers to the ones in the new bitstream to avoid ID collision. Then, the maximum number of layers is updated with the number of layers present in the new stream. For each of these new layers, their dependencies are stored in 855 descriptor of the oinf box. Finally, if the new stream brings a new scalability dimension, the scalability mask is updated accordingly setting to 1 the bit corresponding to this new dimension.

The document w15182 mentioned above, currently defines the LHEVCDecoderConfigurationRecord without indicating the type of scalability used in the bit-stream. If a generic 'lhv1'/'lhe1' is to be used, as currently defined in w15182, a file reader at the client side has to parse the video parameter set (VPS) extensions to understand the scalability type. This VPS may be in the NALU 107 the chunk. This is a complicated process.

According to a preferred embodiment (not represented), it is proposed a new LHEVCDecoderConfigurationRecord which include a 16 bits of scalability mask named 'scalability_mask' (see box 137). According to another embodiment, the scalability mask could be represented on n bits, n being an integer, provided that the whole structure remains aligned on an integer number of bytes. For example n=8 as in HEVC specification.

The LHEVCDecoderConfigurationRecord comprises a field named "general_level_idc" defined in w15182, which is not represented for the sake of clarity. The field "general_level_idc" gives information on the maximum number of pixels, and possible tiles and slices.

According to particular embodiments, it is proposed to add another parameter in the decoder configuration record to disambiguate the kind of layered HEVC that is required to decode the samples, for example after the "general_level_idc" parameter:

"
unsigned int(8) general_level_idc;
unsigned int(16) scalability_mask;
[...]
bit(1) complete_representation;
"

The value of "scalability_mask" ('2' in this example" indicates a scalability of type spatial or quality. This field has the advantage to help a client to detect if the scalability type is supported and to determine whether it will able to play the file. When not able to play the file, it can then select a lower operation point, like for example only the base layer track.

Figure 2:
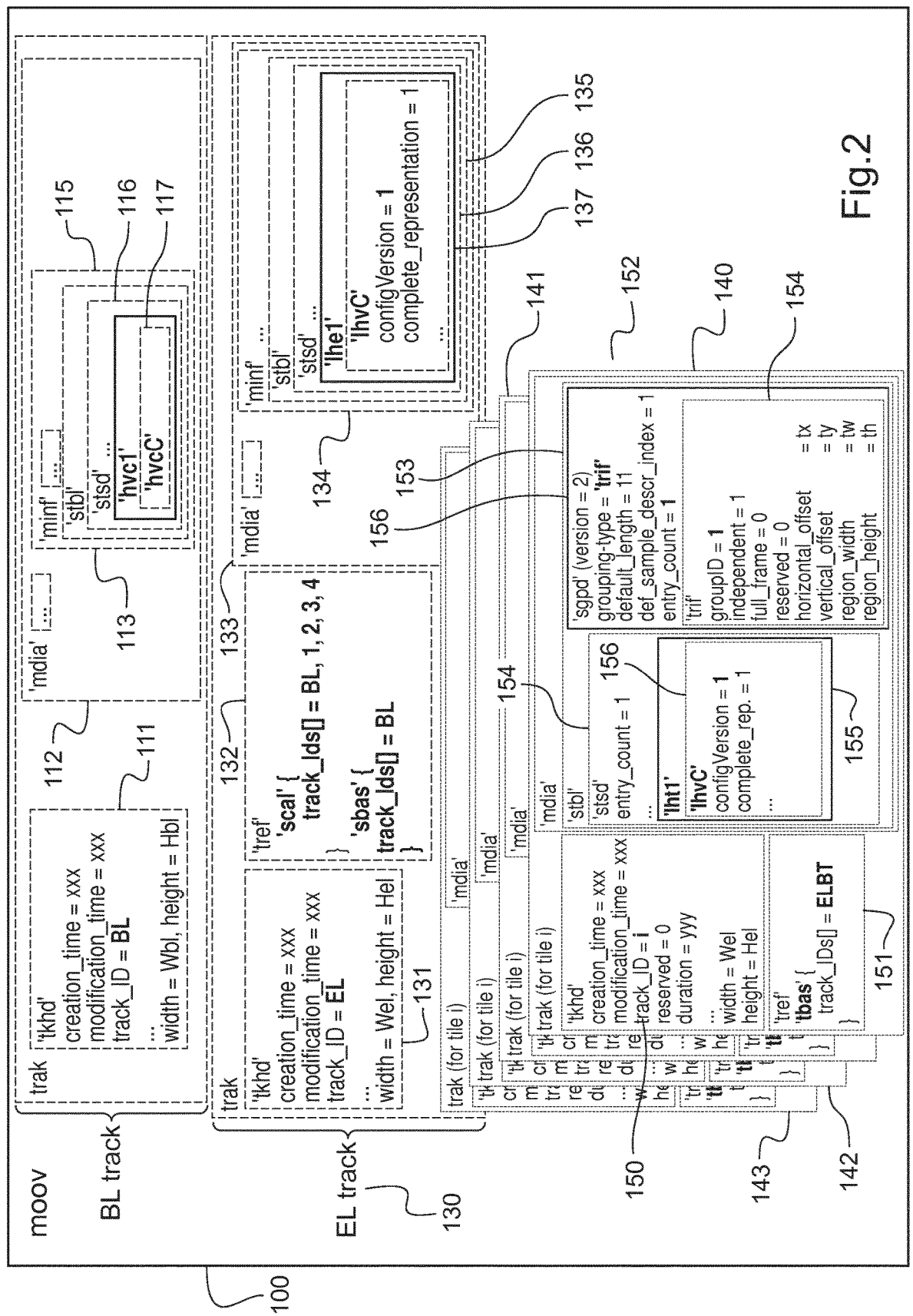
FIG. 2 illustrates an embodiment representing track boxes according to the invention for tiled Layered-HEVC.

FIG. 2 illustrates an example of encapsulating two scalability layers according to the ISO-Base Media File Format when pictures of only the enhancement layer of considered pictures is divided into four tiles. The encapsulation delivers four additional tile tracks (140-143) or enhancement tile tracks ELTT.

In a similar way to HEVC tile tracks, it is possible to define Layered-HEVC tile tracks to allow efficient access of spatial subparts of an enhancement layer. For such cases, according to embodiments, specific tracks are created with specific samples using a LHEVCTileSampleEntry sample description format.

An LHEVC tile track is a video track for which there is a 'tbas' reference to the LHEVC track carrying non video coding layers' NALUs of the HEVC layer to which the tile(s) in this track belong. According to an embodiment of the invention a new sample description type is defined: 'lht1'.

According to embodiments, neither the samples of the tile track nor the sample description box shall contain VPS, SPS or PPS NAL units, these NAL units shall be in the samples or in the sample description box of the track containing the associated layer, as identified by the track reference type 'tbas' (the enhancement layer track 130 in the FIG. 2).

According to embodiment, both the LHEVC tile track and the track or layer track containing the associated layer, as indicated by the 'tbas' track reference, use extractors, as defined in Annex B of w15182, to indicate how the original bit-stream is reconstructed. The presence of extractors in these tile tracks may be constrained in some application domains, for example it may be preferable to put extractors in the tile base tracks rather than in each tile track (as described by reference to FIG. 4a), especially to allow selection of a subset of tiles to decode and play. Or in case of multiple tiled layers, the description size is reduced when placing extractors only in tile base tracks.

FIG. 4, comprising FIGS. 4a and 4b, illustrates examples of alternative track and tile tracks dependency signaling.

According to the signaling example illustrated in FIG. 4a, base layer track 400 comprising timed samples 401 has as many track references 403 to the tile tracks of the base layer as there are tiles (i.e. 4 in FIG. 4a). The base layer track has a 'scal' reference type to each tile track declared in a track reference box (this is defined in the metadata part, for example metadata part 804 in FIG. 8).

Similarly, each tile track has a 'tbas' track reference type declared in its track reference box (this is defined in the metadata part, for example metadata part 804 in FIG. 8).

Moreover, each sample of the base layer track 400 has as many extractors 402 as there are tiles in the base layer.

The enhancement layer 406 comprising samples 407 follow the same description and construction rules. The base layer track and the enhancement layer tracks are cross-referenced via the 'sbas' and 'scal' track reference types 404 and 405. The 'scal' reference type indicates here that extractors are used to reconstruct each sample from the samples in each referenced track.

As illustrated in FIG. 1a, an HEVC or L-HEVC track using tile tracks may use extractors to reference data from its tile tracks, in which case the track shall have 'scal' track references to the tile tracks as shown on FIG. 4a.

Data Sharing and Reconstruction of a Tiled Access Unit

FIG. 4b illustrates an example of dependency signaling according to which no extractor is to be used.

In such a case, an HEVC or L-HEVC track using tile tracks shall indicate the tile ordering using a dedicated 'sabt' track reference type 453 to the tile tracks (and not any more a 'scal' referencing type, reserved for the use of extractors). The tile tracks keep on referencing the tile base track with the 'tbas' track reference type.

The 'sabt' track reference may only be used to refer to tile tracks from an HEVC or L-HEVC track. When the 'sabt' track reference is present in a track, the samples of this track shall not use extractors or aggregators; the sample of the HEVC or L-HEVC track is reconstructed by appending to the sample data the NAL units contained in the samples with the same decoding time (i.e. using the time-to-sample table only without considering edit lists) in all available tracks indicated in the 'sabt' track references of this track, in the order of the track references. If no data is available for a track then no data is aggregated for the corresponding sample. SEI Suffix NAL units shall be moved after all non VCL NAL units in the reconstructed sample.

A track shall not have both 'sabt' and 'scal' track references defined in its track reference box. Additionally, when extractors are not used (implicit AU reconstruction), usage of the 'scal' track reference is not really useful and can be removed. Indeed, the 'oinf' box gives a complete list of layer identifiers for each operating point and the layer identifiers are indicated in the 'tcon' box of each track (or directly in the track as a layer identifier in the decoder configuration information when there is only one layer per track). An access unit is then reconstructed from the respective samples in the required tracks, as indicated by the Operation Point Information Box (and no more by track reference), by arranging their NAL units in an order conforming to ISO/IEC 23008-2 (HEVC standard).

An LHEVC sample stored in a tile track is a complete set of slices for one or more tiles, as defined in ISO/IEC 23008-2. Typically if the tile track refers to a single tile, only the slice(s) used to code this tile is(are) found in the sample. A tile track typically includes one TileRegionGroupEntry (single-tile track), or one TileSetGroupEntry and one or more dependent TileRegionGroupEntry this tile set is made of (multi-tile track), already defined for HEVC.

An LHEVC sample stored in a tile track is considered as a "sync" sample, synchronization sample for random access like seeking for example, if the VCL NAL units in the sample indicate that the coded slices contained in the sample are Instantaneous Decoding Refresh (IDR) slices, Clean Random Access (CRA) slices, or Broken Link Access (BLA) slices.

Sub-sample and sample grouping defined for regular LHEVC (in w15182) samples have the same definitions for an LHEVC tile sample.

According to an embodiment of the invention, an implementation may decide to decode only a subset of the complete tiles of an HEVC sequence. In this case, it may use the tile dependency information in the TileRegionGroupEntry and TileSetGroupEntry sample group descriptions to discard un-needed tracks or ignore some extractors while decoding the HEVC sequence.

In FIG. 2, the elements having the same reference as in FIG. 1 are similar. Moreover, for sake of clarity only the 'moov' box is represented.

In FIG. 2 the 'moov' box comprises additional track boxes which are four tile track boxes 140, 141, 142, 143. Only tile track 141 is described here. The other tile track boxes can be easily deduced.

The tile track box comprises a 'tkhd', Track Header box or sub-box 150, which has the same characteristics as the 'tkhd' boxes 111 or 131 belonging to the BL and EL layer track boxes.

The tile track box comprises a 'tref', Track Reference box or sub-box 151, which has the same characteristics as the 'tref boxes belonging to the BL and EL layer track boxes, except that:

It contains the four bytes 'tbas' to indicate a relationship to a tile base track, and the identifier track IDs[ ] indicates that the tile base track for this track is the enhancement tile track having the identifier "ELBT".

The tile track box comprises an minf (not represented for sake of clarity) box with an 'mdia' box 152, an 'stbl' box or sub-box 153, an 'stsd' box or sub-box 154 as the BL and EL track.

The 'stbl' box 153 comprises two boxes or sub-boxes associating properties to the track samples: 'sgpd' 156 and 'trif' 154 included in 'sgpd'. These boxes are well defined in w15182.

'sgpd' is a SampleGroupDescription box that describes common properties of samples within a particular sample group. Here, the parameter "def_sample_descr_index" indicates the default property applying to all samples of the track: the first (and only one in the 'trif' box).

'trif' is a TileRegionGroupEntry box which comprises the information about the considered tile. In this case, the considered tile is identified by the groupID with value '1' and its position and size are respectively defined by "horizontal_offset", "vertical_offset" and "region_width", "region_height". The reserved parameter has no meanings and the independent flag indicates whether the tile is self-contained (i.e does not need any other tiles to be reconstructed). Finally, the full-frame parameter indicates whether the tile covers the whole picture (1) or not (0).

According to embodiments, four bytes defining a new sample entry 155 indicate that the bit-stream corresponding to media data or samples of an LHEVC tile track, is compliant and usable by an HEVC decoder operating under the configuration (including profile, tier, and level) given in a DecoderConfigurationRecord or more specifically a LHEVCDecoderConfigurationRecord defined below in the 'lhvC' box 156.

In an embodiment the four bytes are: 'lht1'.

The definition of this new sample entry can be the one below:

"

Box Types: 'lht1'
Container: Sample Description Box ('stsd')
Mandatory: No
Quantity: Zero or more sample entries may be present
"

The definition of the new sample entry allows a parser to immediately recognize that it refers to an LHEVC tile track. This was not allowed with the existing sample entries.

Moreover some specific properties only related to tile tracks can be introduced.

As stated above, this sample entry describes media samples of an LHEVC tile track. The width and height of VisualSampleEntry for an LHEVC tile track (sample entry type 'lht1') shall be set to the maximum width and height of the Tile(s) or TileSet(s) contained in the track. The layout information in the track header (i.e., layer, matrix for positioning the tiles, width and height) of a tile track shall be identical to the track header information of the associated reference track (also called tile base track) as identified by the 'tbas' track reference, and otherwise ignored.

Preferably any 'clap' (meaning Clean Aperture) and 'pasp' (meaning Pixel Aspect Ratio) box in an 'lht1' sample description shall be ignored.

Accordingly, a specific sample description is created for an LHEVC tile descriptor that is a specific kind of the standard VisualSampleGroupEntry descriptor

```
class LHEVCTileSampleEntry ( ) extends VisualSampleEntry ('lnt1'){
    MPEG4BitRateBox ( );
    extra_boxes boxes;
}
```

Both MPEG4BitRateBox and extra_boxes are optional.

Preferably the LHEVCTileSampleEntry does not contain any LHE VCConfigurationBox (or LHVCConfigurationBox or any name to designate the configuration box for the layered HEVC format), HEVCConfigurationBox or MPEG4ExtensionDescriptorsBox. Indeed these boxes are found in the tile base LHEVC track sample description, as indicated by the 'tbas' track reference type.

Other optional boxes may be included in the LHEVC-TileSampleEntry. Usually, there are as many entries in the SampleDescriptionBox of an LHEVC tile track as there are entries in the SampleDescriptionBox of the tile base LHEVC track. SampleDescriptionBox is a well-known descriptor of an HEVC tile track, containing descriptive information about the HEVC tile track.

The sub-parameters for the MIME type 'codecs' parameter for LHEVC Tile Track follows the rules defined in annex E.3 of w15182 defining the standard. The decoder configuration record is taken from the base track sample description, as indicated by the 'tbas' track reference type. The sub-parameters for the MIME type 'codecs' are then constructed using this decoder configuration record.

Preferably, codec sub-type parameters for L-HEVC are identical to HEVC ones with the following exception: if the codec type identifies a generic L-HEVC media samples of an LHVC tile track (i.e. 'lhv1' code points), the constructed HEVC codec parameter shall have ".SXX" appended to, "S" indicating the scalability type and "XX" are the bytes corresponding to the value of the scalability mask for this track; the trailing byte may be omitted if zero. This can be useful for example in DASH Representations to have precise information on the codec used to encode the associated video. For example, in a multi-view streaming application, the DASH client having a multi-layer HEVC decoder would not select a Representation declared with a codec parameter indicating a spatial or quality scalability.

In an alternative embodiment related to the sub-parameters for MIME type codecs, a more compact form of the MIME type than the one proposed in w15182 can be useful in DASH. Especially in the configuration with one layer per track with a single scalability type; i.e. when the sample entry within a list item of the optional codecs MIME parameter is 'shv1', 'she1', 'mhv1', 'mhe1', 'lhv1' or 'lhe1', no further data is provided in the same list item. In particular, since one single operating point is announced, the BLInternal parameter can become optional as well as the Olsldx and MaxTid parameters. This allows skipping the 'lhevcptl' option and declaring for example an enhancement layer (scalable) as "shv1.A7.1.L120.B0".

Figure 3:
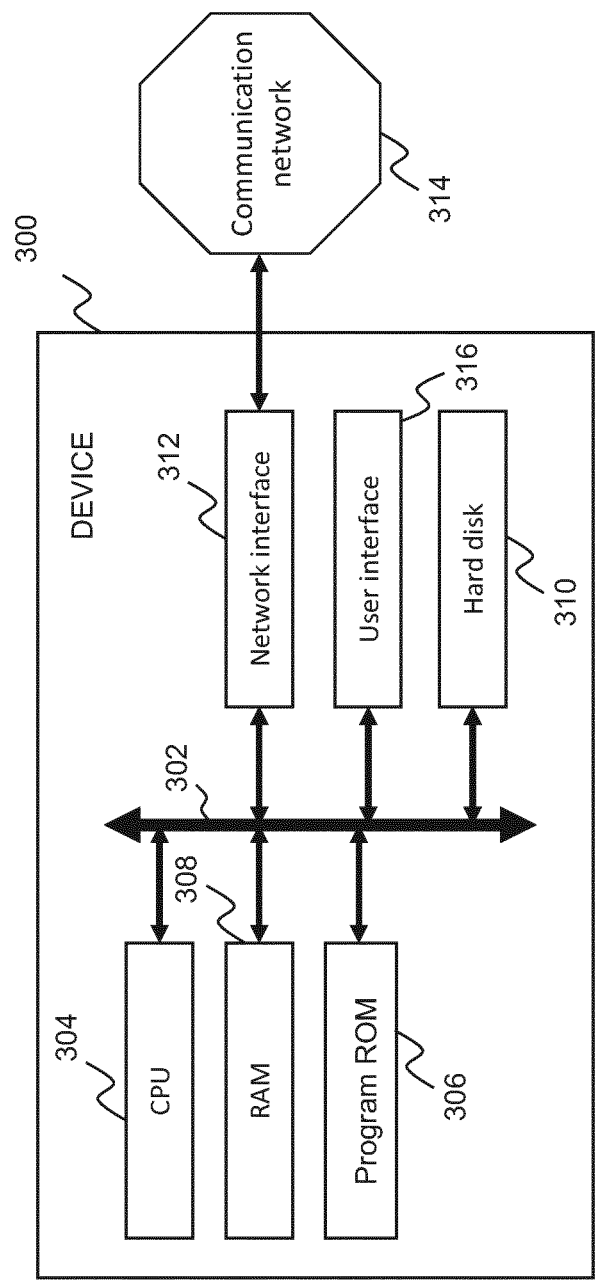
FIG. 3 represents a block diagram of a server or a client device in which one or more embodiments may be implemented.

FIG. 3 represents a block diagram of a server or a client device 300 in which steps of one or more embodiments may be implemented.

Preferably, the device 300 comprises a communication bus 302, a central processing unit (CPU) 304 capable of executing instructions from program ROM 306 on powering up of the device, and instructions relating to a software application from main memory 308 after the powering up.

The main memory 308 is for example of Random Access Memory (RAM) type which functions as a working area of CPU 304 via the communication bus 302, and the memory capacity thereof can be expanded by an optional RAM connected to an expansion port (not illustrated). Instructions relating to the software application may be loaded to the main memory 308 from a hard disk (HD) 310 or the program ROM 306 for example. Such software application, when executed by the CPU 304, causes the encapsulation step described with reference to FIGS. 1 and 2 to be performed in the server.

Reference numeral 312 is a network interface that allows the connection of the device 300 to the communication network 314. The software application when executed by the CPU 304 is adapted to react to requests received through the network interface and to provide data streams and requests via the network to other devices.

Reference numeral 316 represents user interfaces to display information to, and/or receive inputs from, a user.

It should be pointed out here that, as a variant, the device 300 for managing the reception or sending of multimedia bit-streams can consist of one or more dedicated integrated circuits (ASIC) that are capable of implementing the method as described with reference to FIGS. 1, 2, and 3 These integrated circuits are for example and non-restrictively, integrated into an apparatus for generating or displaying video sequences and/or for listening to audio sequences.

Embodiments of the invention may be embedded in a device such as a camera, a smartphone, or a tablet that acts as a remote controller for a TV, for example to zoom into a particular region of interest. They can also be used from the same devices to have personalized browsing experience of a TV program by selecting specific areas of interest. Another usage of these devices by a user is to share selected sub-parts of his/her preferred videos with other connected devices. They can also be used in smartphone or tablet to monitor what happens in a specific area of a building placed under surveillance provided that the surveillance camera supports the generation part of this invention.

Naturally, in order to satisfy local and specific requirements, a person skilled in the art may apply to the solution described above many modifications and alterations all of which, however, are included within the scope of protection of the invention as defined by the following claims.

The invention claimed is:

1. A method for generating description data relating to a layered bit stream based on a plurality of layers including a base layer and at least one enhancement layer, the method comprising:
   grouping a plurality of samples corresponding to the layered bit stream into a plurality of sample groups;
   determining at least one operating information item for at least one sample group among the plurality of sample groups, wherein each of the at least one operating information item represents an independently decodable subset of the layered bit stream, and
   generating description data describing at least the at least one operating information item for the at least one sample group among the plurality of sample groups.

2. The method according to claim 1, further comprising outputting the generated description data to an apparatus in response to a request from the apparatus.

3. The method according to claim 1, wherein each of the at least one operating information item specifies that a bit stream based on the base layer is independently decodable and a bit stream based on both of one of the at least one enhancement layer and the base layer is independently decodable.

4. The method according to claim 1, wherein image quality of a bit stream based on both of the base layer and one of the at least one enhancement layer is higher than image quality of a bit stream based on the base layer.

5. The method of claim 1, further comprising obtaining at least one layer information item, said at least one layer information item providing metadata related to layer organization in the layered bit-streams.

6. The method of claim 5, wherein one layer information item is defined as a default layer information item so that samples belonging to a group of samples that is not associated with metadata related to layer organization are decoded based on the metadata provided by the default layer information item.

7. The method of claim 1, wherein an operating information item is defined as a default operating information item so that samples belonging to a group of samples that is not associated with metadata related to descriptive information are decoded based on the metadata provided by the default operating information item.

8. A method for obtaining media data and metadata from an encapsulated bit stream resulting from the encapsulation of one or more bit streams, the media data of each of the one or more bit-streams being organized into a plurality of layers including a base layer and at least one enhancement layer, the method comprising:
   obtaining description data describing at least one operating information item for at least one of the one or more bit-streams; and
   obtaining at least one of the at least one described operating information item, each of the at least one obtained operating information item representing one sample group in which samples are independently decodable.

9. The method according to claim 8, further comprising requesting to an apparatus the description data.

10. The method according to claim 8, wherein each of the at least one operating information item specifies that a bit stream based on the base layer is independently decodable and a bit stream based on both of one of the at least one enhancement layer and the base layer is independently decodable.

11. The method according to claim 8, wherein image quality of a bit stream based on both of the base layer and one of the at least one enhancement layer is higher than image quality of a bit stream based on the base layer.

12. The method of claim 8, further comprising obtaining at least one layer information item, the at least one layer information item providing metadata related to layer organization in the layered bit-streams.

13. The method of claim 12, wherein one layer information item is defined as a default layer information item so that samples belonging to a group of samples that is not associated with metadata related to layer organization are decoded based on the metadata provided by the default layer information item.

14. The method of claim 8, wherein an operating information item is defined as a default operating information item so that samples belonging to a group of samples that is not associated with metadata related to descriptive information are decoded based on the metadata provided by the default operating information item.

15. The method of claim 8, further obtaining from an operating information item an order for reconstructing the samples of the first sample group.

16. A non-transitory computer-readable storage medium storing instructions of a computer program for implementing a method for obtaining media data and metadata from an encapsulated bit stream resulting from the encapsulation of one or more bit streams, the media data of each of the one or more bit-streams being organized into a plurality of layers including a base layer and at least one enhancement layer, the method comprising:
   obtaining description data describing at least one operating information item for at least one of the one or more bit-streams; and
   obtaining at least one of the at least one described operating information, each of the at least one obtained operating information item representing one sample in which samples are independently decodable.

17. A device for generating description data relating to a layered bit stream based on a plurality of layers including a base layer and at least one enhancement layer, the device comprising a microprocessor configured for carrying out the steps of:
   grouping a plurality of samples corresponding to the layered bit stream into a plurality of sample groups;
   determining at least one operating information item for at least one sample group among the plurality of sample groups, wherein each of the at least one operating information item represents an independently decodable subset of the layered bit stream; and
   generating description data describing at least the at least one operating information item for the at least one sample group among the plurality of sample groups.

18. A device for obtaining media data and metadata from an encapsulated bit stream resulting from the encapsulation of one or more bit streams, the media data of each of the one or more bit-streams being organized into a plurality of layers including a base layer and at least one enhancement layer, the device comprising a microprocessor configured for carrying out the steps of:
   obtaining description data describing at least one operating information item for at least one of the one or more bit-streams; and
   obtaining at least one of the at least one described operating information item, each of the at least one obtained operating information item representing one sample group in which samples are independently decodable.

19. A non-transitory computer-readable storage medium storing instructions of a computer program for implementing a method for generating description data relating to a layered bit stream based on a plurality of layers including a base layer and at least one enhancement layer, the method comprising:
   grouping a plurality of samples corresponding to the layered bit stream into a plurality of sample groups;
   determining at least one operating information item for at least one sample group among the plurality of sample groups, wherein each of the at least one operating information item represents an independently decodable subset of the layered bit stream, and
   generating description data describing at least the at least one operating information item for the at least one sample group among the plurality of sample groups.

* * * * *